(12) United States Patent
Lieberman et al.

(10) Patent No.: US 6,650,810 B1
(45) Date of Patent: Nov. 18, 2003

(54) TUNABLE FILTER

(75) Inventors: Robert A. Lieberman, Torrance, CA (US); John D Prohaska, Millbury, MA (US); Lothar U Kempen, Redondo Beach, CA (US)

(73) Assignee: Physical Optics Corporation, Torrance, CA (US)

( * ) Notice: Subject to any disclaimer, the term of this patent is extended or adjusted under 35 U.S.C. 154(b) by 189 days.

(21) Appl. No.: 09/639,063

(22) Filed: Aug. 15, 2000

(51) Int. Cl.[7] ............................................. G02B 6/34
(52) U.S. Cl. ........................ 385/37; 385/10; 385/15; 385/31; 385/32; 385/124; 356/302; 356/303; 356/328
(58) Field of Search .......................... 385/1, 4, 10, 15, 385/31, 32, 37, 47, 124; 356/302, 303, 328

(56) References Cited

U.S. PATENT DOCUMENTS

| | | | | |
|---|---|---|---|---|
| 6,058,226 A | * | 5/2000 | Starodubov | 385/12 |
| 6,253,008 B1 | * | 6/2001 | Harumoto et al. | 385/37 |
| 6,275,631 B1 | * | 8/2001 | Jang | 385/37 |
| 6,303,040 B1 | * | 10/2001 | Oh et al. | 216/24 |
| 6,321,008 B1 | * | 11/2001 | Riant et al. | 385/37 |
| 6,337,937 B1 | * | 1/2002 | Takushima et al. | 385/28 |

* cited by examiner

*Primary Examiner*—Akm Enayet Ullah
*Assistant Examiner*—Jennifer Doan
(74) *Attorney, Agent, or Firm*—Lawrence S. Cohen

(57) ABSTRACT

A tunable optical filter for simulating the waveband spectrums of selected substances. The filter includes an optical waveguide with a core material for transmitting light energy and a nominal core refractive index for the core material. Predetermined periodic variations are formed in the core material of the optical waveguide between the input and output ends that alter the core refractive index of the waveguide at the location of the periodic variations. Depending upon the periodic variations, the waveguide produces a predetermined reference waveband spectrum output that matches the waveband spectrum of a selected substance. A modulator is coupled to the waveguide to selectively modulate the periodic variations to intermittently shift the reference waveband spectrum output to fine tune the filter and reduce signal noise. The filter is useful as a reference cell for correlation spectroscopy, DIAL LIDAR, equipment calibration, and other uses where a predetermined or known waveband spectrum is useful or desirable.

50 Claims, 15 Drawing Sheets

TUNABLE FILTER

BACKGROUND OF THE INVENTION

1. Field of the Invention

The present invention relates generally to the field of optical waveguides, and more particularly to a high sensitivity filter and a method of filtering certain wavelengths of light utilizing a tunable optical waveguide.

2. Discussion of the Related Art

Detecting chemical substances in any environment is a difficult task. Spectroscopic techniques are by far the most prevalent and most utilized for investigating and detecting the presence of chemical substances. Though spectroscopic techniques are widely utilized, there are many associated problems and difficulties, especially when such techniques are needed and performed outside of a controlled laboratory environment. Known spectroscopic techniques are very sensitive to conditions of the measurement environment and are not particularly versatile. Therefore, practitioners bear the burden of enormous expense and logistical difficulties in order to utilize these known methods in field applications beyond the laboratory environment.

One example of a widely used method is known as correlation spectroscopy. In this method, the wavelength spectrum of a detection system or energy source is periodically modulated into and out of a spectrum match with characteristic features of the spectrum of a known target substance that is usually in a gaseous state. Such correlation spectroscopy systems are used to obtain critical information and data from a monitored environment. Specifically, correlation spectroscopy is used for monitoring the atmospheric contents at a given moment in time or in a specified space. To determine whether a particular chemical substance exists in an environment, a practitioner must have available a self-contained reference cell containing therein a quantity of the particular gaseous substance. If a practitioner is out in the field, and if the detection of several substances is desired, a reference cell must be available that can be evacuated and refilled separately with each different reference substance and a certain amount of each substance must be on hand. Alternatively, a number of reference cells each containing one of the particular substances must be available at the site. This method is extremely costly and inconvenient and requires careful handling to utilize such reference cells for field detection and experimentation applications.

Despite the cost and inconvenience, over the past 20 years such correlation spectroscopy systems have been widely used all over the world because of the reliable results that can be achieved. Particularly, long path reference cells have been transported along with very large gas-laser spectrographs in aircraft or by other modes of transportation in order to do testing in the field.

Looking to more recent technology, tunable semiconductor laser diodes can now be custom-engineered to elicit spectral ranges that match some of the light or energy absorbance characteristics of selected target chemical species. Tunable laser diodes are extremely expensive and are also difficult to transport, although the diodes do eliminate the need to transport and maintain the traditional reference cells and gaseous samples in order to conduct field evaluations. In addition, tunable laser diodes are typically only useful and accurate over a fairly narrow spectral range.

Other alternative types of tunable filters, for example, Fabry-Perot tunable filters, are known and sometimes utilized for chemical detection. However, no alternative type of tunable filter produces highly accurate spectral recording data. These alternative filters thus produce an unsuitable spectral match to a target compound absorbance range.

A typical correlation spectroscopy method compares the wavelength spectrum of light passing through a sample environment to be analyzed with the wavelength spectrum of a known target substance. The spectra can be compared optically in a number of different ways. One way is to split a light source into two separate paths with one path being passed through the sample substance and the other passed through the known reference or target substance. Once the light from the two paths is passed through the two substances, the light is re-combined. The spectral characteristics and intensity of the light in the two paths can be measured separately and compared to one another to determine the presence of and/or the concentration of the target substance within the sample. Alternatively, the light re-combined from the two paths can be measured and compared to the characteristics of the original light source prior to passing through the two substances and prior to splitting the light source.

To hone or enhance readings, the wavelength spectrum of light passing through the reference chamber or reference substance is periodically modulated or shifted during measurement. Modulation is done in order to minimize signal noise, to increase the sensitivity of the measurement, and produce a more precise reading. Modulation is often done for conventional correlation spectroscopy techniques by producing pressure changes, temperature changes or electrical field changes within the gas reference cell, or, for example, by changing a characteristic of a filter such as the spacing of a Fabry-Perot cavity. Utilizing these means to modulate the spectrum of light that passes through a reference cell or a currently known filter, however, cannot be done at sufficiently small or precise increments. Therefore, these techniques do not produce adequately sensitive readings. The sensitivity produced by these methods is not as high as is necessary to detect relatively low concentrations or small concentrations of a substance.

SUMMARY OF THE INVENTION

The present invention is for a method and an apparatus to overcome the above-described problems and other deficiencies associated with prior art chemical detection systems and techniques. The invention includes both a method and an apparatus that are much more convenient and less cumbersome to use for chemical substance detection both in a laboratory and in field applications. Additionally, the invention eliminates the necessity of transporting, refilling, storing and maintaining multiple reference gas cells. The invention also eliminates the necessity of transporting, refilling, storing and maintaining multiple gases and other chemical substances that are sometimes flammable, explosive or otherwise dangerous.

One object of the present invention is to eliminate problems created when a gas reference cell leaks, loses pressure, or changes concentration by undesired admission of air into the reference cell. A further object of the present invention is to eliminate the necessity of maintaining and transporting reference cells. These cells can often be fairly large where the particular reference substance has a wavelength range absorption with a long wavelength path. Another object of the present invention is to provide a method useful for correlation spectroscopy that is less costly to set up and perform, is less difficult and cumbersome to use, is easier to use in field applications, and produces more accurate results. An additional object of the present invention is to provide an apparatus that can be utilized for correlation spectroscopy that is less costly to produce and purchase, is less difficult to use, produces more accurate results, and is less costly and easier to transport and maintain in field applications.

A still further object of the present invention is to provide such a detection method and apparatus that can also be adapted and used for other purposes. One such purpose for which the present invention is particularly well suited is for calibrating a spectroscope in a highly accurate and simple manner. A further object of the present invention is to provide a method and apparatus useful in other fields such as, for example, differential absorption laser devices and distance array radar systems.

Devices and methods are disclosed herein to achieve these and other objects of the present invention. In one embodiment, the present invention provides a device that simulates the absorbance characteristics or wavelength spectrum of a desired substance upon passing light energy through the device. The device includes an optical waveguide having a core material, an input end, an output end, and a nominal core refractive index. The waveguide also has predetermined periodic variations in the refractive index formed in the core somewhere between the input and the output ends. The periodic variations change the nominal core refractive index of the waveguide producing regions of altered refractive indices that reflect a predetermined set of wavelengths. The periodic variations or altered refractive index regions are predetermined to produce characteristic wavelengths of a reference spectrum that match a target wavelength spectrum of a target or selected substance. The periodic variations or altered refractive index regions can be formed such that the characteristic wavelengths of the reference spectrum are produced either as filtered light passing to the output end or as light reflected by the periodic variations back to the input end. The periodic variations are intermittently modulated or shifted to fine-tune the reference spectrum.

In one embodiment, the device has a modulator coupled to the waveguide to intermittently modulate the regions of altered refractive index and hence the characteristic wavelengths of the reference spectrum of the waveguide.

In one embodiment, the device has a light energy source coupled to the input end of the waveguide. The light energy source can be any type of light source producing either a coherent or an incoherent beam of light.

In one embodiment, the device has an energy source coupled to the modulator to selectively apply energy to the modulator to intermittently alter a physical characteristic of the waveguide. Altering the physical characteristic in turn modulates the periodic variations of the waveguide in order to modulate the characteristic wavelengths of the reference spectrum.

In one embodiment, the waveguide is an optical fiber having a fiber core as the core material surrounded by a fiber cladding material. In another embodiment, the periodic variations are a Bragg grating formed in the core of the optical fiber having a plurality of spaced apart altered refractive index regions or individual gratings. In another embodiment, the modulator periodically alters the characteristic spacing and thus intermittently shifts the refractive index of the gratings to modulate the characteristic wavelength of the reference spectrum of the gratings.

In one embodiment, the modulator is a cylinder or ring of material having an alterable circumference or diameter. The waveguide is wrapped around the circumference of the cylinder. The size of the circumference is modulated to periodically stretch the waveguide at the periodic variations to modulate the characteristic wavelengths of the reference spectrum of the waveguide.

In one embodiment, the modulator includes a planar substrate having the waveguide attached or fixed to one surface. A physical characteristic of the one surface is intermittently altered which in turn modulates the periodic variations and thus the characteristic wavelengths of the reference spectrum of the waveguide. The modulator may vary within the scope of the invention and other modulator constructions are described herein.

In another embodiment of the invention, a method of producing a very accurate and predetermined reference wavelength spectrum is disclosed. The method includes providing an optical waveguide having a core material, an input end, an output end, and a nominal core refractive index. Predetermined periodic variations in the refractive index are added to the core material of the waveguide to produce regions of altered refractive index in the core material. The periodic variations produce a reference spectrum having characteristic wavelengths. A source of light energy having known spectral characteristics is coupled to the input end of the waveguide. The spectral characteristics are monitored either at the output end of light energy after passing through the waveguide or at the input end of light energy after being reflected by the periodic variations back to the input end. The periodic variations are modulated to intermittently modulate the characteristic wavelengths of the reference spectrum. This modulation enables signal processing techniques that reduce signal noise of the monitored light energy.

In one embodiment, the method of the invention is used for correlation spectroscopy in detecting the presence of a substance in a test or sample environment. The periodic variations in the refractive index of the tunable filter are tailored so that the characteristic wavelengths of the reference spectrum match the optical absorbance spectrum of a selected or target substance.

In one embodiment, an identical light energy source is passed through both the tunable filter waveguide and the sample environment. The waveband spectrum characteristics of the light energy exiting both the tunable filter waveguide and the sample environment are monitored and compared to determine the presence or absence of the selected substance. If the characteristic wavelengths of the reference spectrum and a portion of the target spectrum of the sample environment match, the substance is known to be present in the sample environment.

In one embodiment, a light energy source is passed first into the tunable filter waveguide designed to match the selected substance. Light energy reflected back by the periodic variations is then passed through the sample environment. The light energy emerging from the sample environment is then monitored to determine the presence or absence of the selected target substance. If the characteristic wavelengths of the reference spectrum are absorbed in the sample environment, the substance is present in the test or sample environment.

In one embodiment, the step of modulating is achieved by fixing the waveguide to a substrate and intermittently altering a physical characteristic of the substrate to selectively shift the periodic variations in the refractive index to intermittently alter the characteristic wavelengths of the reference spectrum of the waveguide. The step of modulating can be conducted in many different ways and yet fall within the scope of the invention.

These and other objects, features and advantages of the present invention will be better appreciated and understood when considered in conjunction with the following description and accompanying drawings. It should be understood that the following description indicates one or more preferred embodiments of the present invention, but is given only to illustrate and not to limit the invention. Many changes and modifications may be made within the scope of the present invention without departing from the spirit thereof, and the invention includes all such modifications.

BRIEF DESCRIPTION OF THE DRAWINGS

A clear conception of the advantages, features, construction, and operation of the present invention will become more readily apparent by referring to the exemplary, and therefore nonlimiting embodiments illustrated in the drawings accompanying and forming a part of this specification, wherein like reference numerals designate the same elements in the several views and in which.

DETAILED DESCRIPTION OF THE PRESENTLY PREFERRED EMBODIMENTS

A. General Introduction

The present invention is generally directed to a tailored high-performance optical filter particularly suited for sensors and monitors used in correlation spectroscopy as well as other uses. In general, the invention is for a method of producing a reference spectrum that matches a selected substance. The invention is also for an artificial reference device or matched filter having refractive index variations that filter certain wavelengths of light energy passing through the filter to produce a reference spectrum having characteristic wavelengths that match an absorbance or target spectrum of a selected substance. The matched filter can be tuned or modulated to permit high-sensitivity measurements of target species and yet can be produced at relatively low cost, maintained very easily and safely, and produced in a very compact design. The tunable filter is useful in a number of different fields and is particularly useful for field testing using correlation spectroscopy as well as for calibrating spectroscopes and other such devices.

The present invention is described throughout utilizing a specific demonstration example developed and tested by the assignee of the present invention. Where appropriate, certain variations of the invention different from the example are noted and described.

With that in mind, a number of tunable filter constructions that fall within the scope of the present invention are described. Additionally, various techniques for modulating the filter are also described. Other alternative constructions are mentioned where appropriate and particular alternative uses for the tunable filter of the invention that are different from the specific example of correlation spectroscopy are briefly described.

Figure 1:
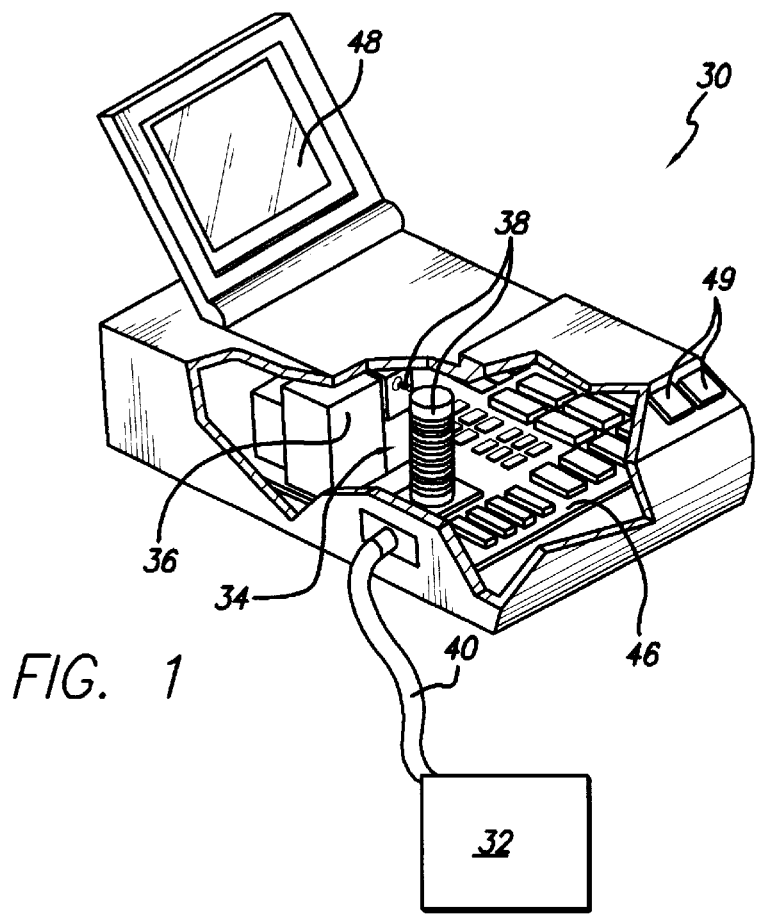
FIG. 1 illustrates a partial fragmentary perspective view of an artificial reference cell utilizing a tunable tailored filter constructed in accordance with one embodiment of the present invention.

B. Description of Correlation Spectroscopy
1. Correlation Spectroscopy Device of the Invention Referring to the drawings, FIG. 1 illustrates a device 30 utilized to detect the presence of a target or selected substance such as a gas compound in a specific test or sample environment 32. The environment 32 can be any type of environment including the atmosphere, an enclosed room in a building, a mineshaft, or any other type of environment.

The device 30 includes a tunable filter assembly 34 constructed in accordance with the principles of the present invention as described in greater detail below. The device 30 has a light source 36 that passes light into the tunable filter assembly 34 providing a near-infrared reference spectrum at selected characteristic wavelengths that are compared by the device to the measured test wavelength spectrum taken from the test or sample environment 32. The device 30 compares the reference spectrum of the target or selected substance to the measured sample or test spectrum in order to determine whether the selected substance is present in the environment 32. The device 30 can, as is illustrated in FIG. 1, also be designed and adapted to provide a digital or analog reading indicative of the particular amount of the selected substance present in the test or sample environment 32.

The light source 36 is operably coupled to an optical waveguide 38 so that the light energy from the light source enters the optical waveguide 38 and is appropriately filtered to produce the characteristic wavelengths of the reference spectrum, which is then compared to the environment 32. As will become apparent herein, the reference spectrum of the filter can either be produced by the portion of the light energy reflected back toward the input end of the waveguide, or by the portion of the light energy passing through the waveguide to the output end. In the present embodiment, the optical waveguide 38 is in the form of an optical fiber suitably manufactured as described below to provide the wavelength filter characteristics needed for a particular comparison. Other optical waveguide constructions are described herein as well that differ from the fiber optic cable construction and yet fall within the scope of the invention.

Generally, the light source 36 provides light energy to the tunable filter assembly 34 and specifically coupled into the optical waveguide 38. The light energy passes into the optical waveguide 38 and, via the particular filter characteristics manufactured in the waveguide 38, produces a near-infrared reference spectrum that simulates that of the particular selected substance. For example, methane was used as a specific example during testing as described below, but other substances can be selected as well.

A long cable 40 or other data-collecting element extends from the device 30 and into the sample environment 32. Light energy is coupled to the environment 32 through the cable 40. The light energy from the source 36 may either be: 1) split into two beams and passed in parallel directly into both the waveguide 38 and the environment 32; 2) passed first into the waveguide 38 with the reflected light energy from the waveguide 38 then passed into the environment 32; or 3) passed into the waveguide 38 with the light energy transmitted through the waveguide 38 then passed into the environment 32. Alternatively, the light energy passed into the environment 32 may be provided by a separate light source (not shown) identical to light source 36.

This light energy after passing through the gas within the environment produces a sample or test near-infrared spectrum at various wavelengths. The sample spectrum at selected wavelengths is compared to the characteristic wavelengths of the reference spectrum of the tunable filter assembly 34 in order to determine whether the selected target substance is present within the sample environment 32. Depending upon the characteristics of the filter assembly 34, virtually any substance can be selected and any environment tested to determine the presence of the selected substance.

For the process of correlation spectroscopy, light energy is passed through the target or reference gas held in a cell and typically modulated to filter out signal noise from the spectrum. In conventional correlation spectroscopy, the light source is passed through a cell containing a quantity of the selected target substance. The pressure within the gas cell can be periodically altered in order to modulate the light energy absorbance characteristics of the substance. Such a technique produces results that are not necessarily accurate or of sufficient intensity because pressure modulation cannot be controlled as precisely as necessary. Utilizing the tunable filter assembly 34 of the invention yields vastly improved results over this conventional spectroscopy technique.

In the present invention, the tunable filter assembly 34 construction can vary considerably without departing from the scope of the invention. In the generally described embodiment of FIG. 1, the tunable filter assembly 34 has an elongate cylinder 44 around which the fiber optic filter cable or optical waveguide 38 is wrapped. The cylinder is constructed of a suitable material which, when subjected to an energy source provided by suitable electronics 46 of the device 30, expands to intermittently change or modulate the length of the optical waveguide 38. By varying the length, the characteristic refractive index of the waveguide is modulated. This stretching, as described in greater detail below, induces a stress upon a filter portion of the waveguide to modulate the refractive index and hence the reference spectrum of the tunable filter assembly.

The device 30 of FIG. 1 can vary in size, shape and construction without departing from the scope of the invention. The device may also include a display screen 48 so that a user can easily view the results or readings produced by the device. The device may also include a number of surface controls 49 for setting various parameters necessary to conduct a particular test.

2. Characteristics of Gases

The infrared spectra of most chemical compounds at infrared wavelengths between about 3 micrometers ($\mu$m) and 8 $\mu$m are typically unique. The mid-wavelength range for most chemical compounds is often called the "fingerprint region" of the optical spectrum. The mid-infrared region or fingerprint region is routinely used to identify and quantify the chemical contents of unknown samples of gas. The light energy absorbance of most compounds within this fingerprint region corresponds to the excitation of fundamental vibrational modes of individual molecules.

Figure 2:
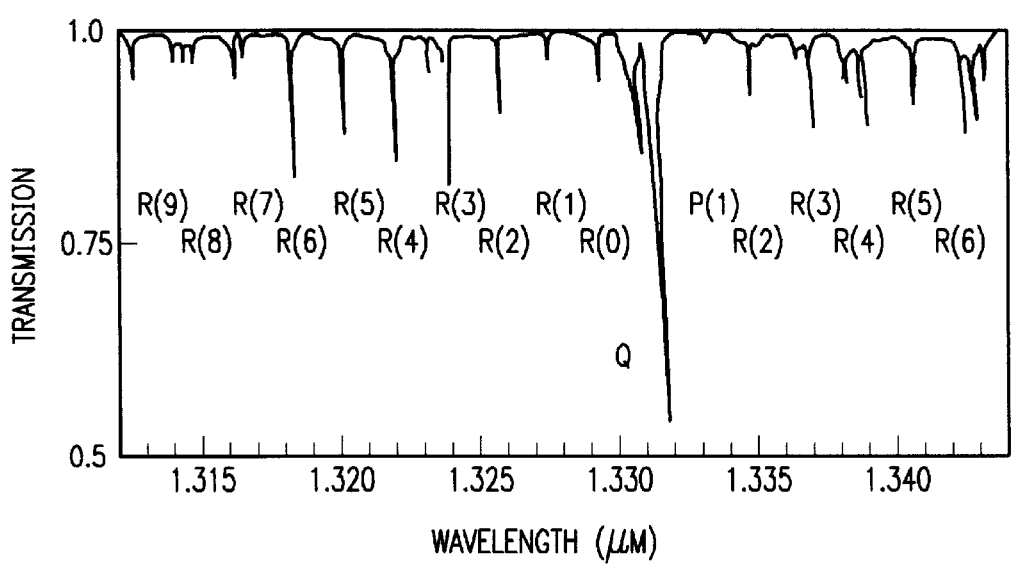
FIG. 2 illustrates a near-infrared optical absorbance plot for methane at one pressure.

Less well known is the fact that the vibrational spectra at shorter wavelengths corresponding to higher harmonics or "overtone" modes and combinations of fundamental molecular motions are also highly characteristic of individual molecules. As an example, the near-infrared spectrum of methane, used as the specific example for the demonstration described herein, is illustrated for two particular regions in FIG. 2. FIG. 2 illustrates the near-infrared or optical absorbance of the $v_2+2v_3$ combination band of methane. Most other compounds or gaseous substances produce similar unique spectra within the fingerprint region of the optical spectrum.

3. General Filter Performance

Though described in greater detail below, a tunable filter assembly of the present invention is constructed utilizing the understanding of the shorter wavelength region to produce a reference spectrum with wavelength characteristics having essentially the same near-infrared spectrum as a selected substance such as, for example, methane. As one example, an optical fiber can be produced having periodic variations in the refractive index of the core by writing one or more Bragg gratings directly into the core of the fiber. The Bragg gratings are particularly tailored in order to filter certain wavelengths of light passing through the fiber from an input end to an output end. The Bragg gratings reflect certain wavelengths of light back toward the input end of the fiber thereby producing a predetermined reference spectrum either reflected back toward the input end or passing through the fiber to the output end. Depending upon the particular application, either the reflected spectrum or the passed spectrum can be tailored to match the wavelength spectrum of the selected substance.

Figure 3:
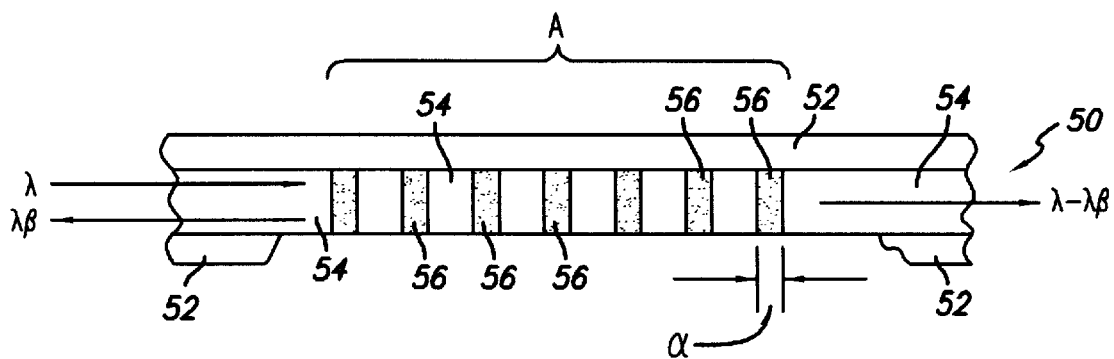
FIG. 3 illustrates a schematic of a fiber optic Bragg grating in an optical fiber.

FIG. 3 illustrates a schematic view of an optical fiber with a single Bragg grating formed in the fiber core. A typical optical fiber 50 includes an outer cladding 52 that surrounds a glass core 54 that has a nominal core refractive index. The fiber optic core 54 is altered by one of several processes described below to form periodic variations in the nominal core refractive index defining a Bragg grating A that changes the core refractive index of the fiber 50. The grating is shown in FIG. 3 as a plurality of altered refractive index regions 56, together referred to herein as the Bragg grating A. The nominal core refractive index is altered at the position of each element or region 56 of the grating A. The band of wavelengths filtered by the optical fiber Bragg grating A is controlled by the size α and spacing or period of the gratings or altered index regions 56. A single fiber optic Bragg grating generally only reflects light at a single, narrow band of wavelengths. As shown in FIG. 3, the light energy entering the fiber 50 is represented by $\lambda$. The light energy filtered or reflected back to the input end of the fiber 50 by the regions 56 is represented by $\lambda_B$. The remaining or unfiltered light energy exiting the fiber 50 at the output end is represented by $\lambda-\lambda_B$, or the difference between the entering light and filtered light.

Figure 4:
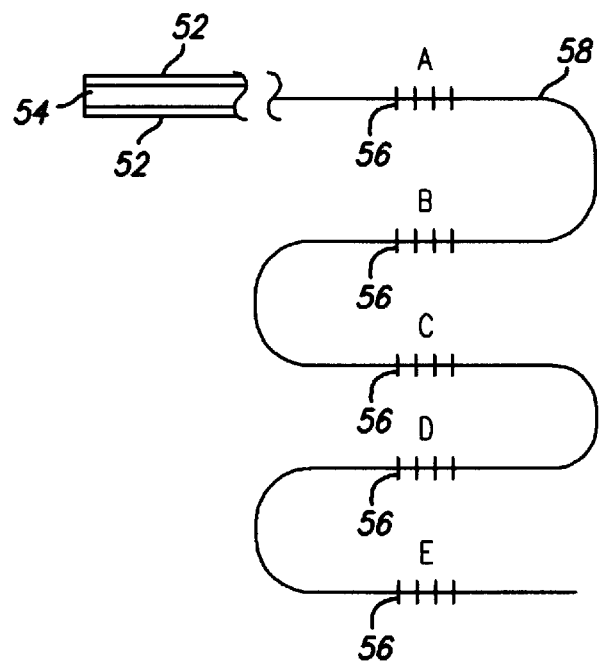
FIG. 4 illustrates several fiber optic Bragg gratings concentrated in a single fiber.

FIG. 4 illustrates a means whereby the spectral properties of several Bragg gratings can be combined to simulate an optical spectrum like the one shown in FIG. 2. In FIG. 4, Bragg gratings A, B, C, D, and E are shown schematically, each having a spacing between altered refractive index regions 56 that is different from the spacing of the other gratings. The fiber 58 produces a desired spectral output that matches the spectrum of a selected substance, depending on the particular formation of the gratings A–E in the fiber core. Such a fiber 58 can be referred to as a matched filter for the selected substance.

Figure 5:
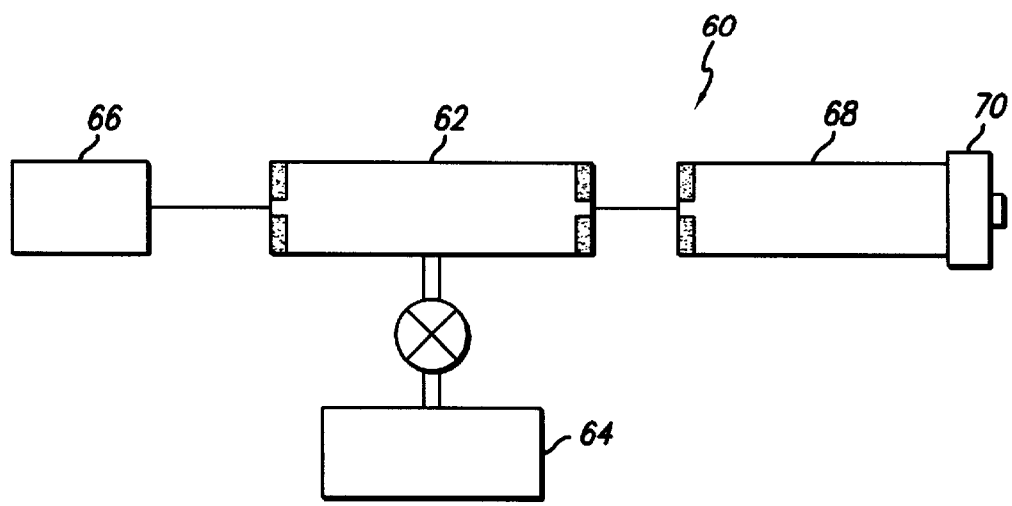
FIG. 5 illustrates a conventional reference cell utilized for correlation spectroscopy including a pressure-modulation cell.

In order to produce a highly sensitive and accurate output, the refractive index periodic variations in the filter are modulated to detect and eliminate signal noise in the spectral output and to pin point the desired spectral image. For a conventional correlation spectroscopy system 60 using a gas reference or test cell 62, as illustrated in FIG. 5, pressure modulation through an air or air/water combination pumping system 64 is often conducted to filter signal noise. Light energy from, for example, a light emitting diode 66 or other source is passed through the reference cell 62 containing a known concentration of a selected gas at a known pressure. Next, the light energy is passed through a separate sample cell 68 containing a test gas sample to be analyzed. The pressure within the reference cell 62 is periodically or intermittently varied in order to produce the desired wavelength modulation of the signal. A detector 70 at the far end of the sample cell detects the light passing through the cells and produces an output whose intensity modulation is proportional to the amount of the selected or test gas present in the reference or test gas sample cell 68.

Figure 6:
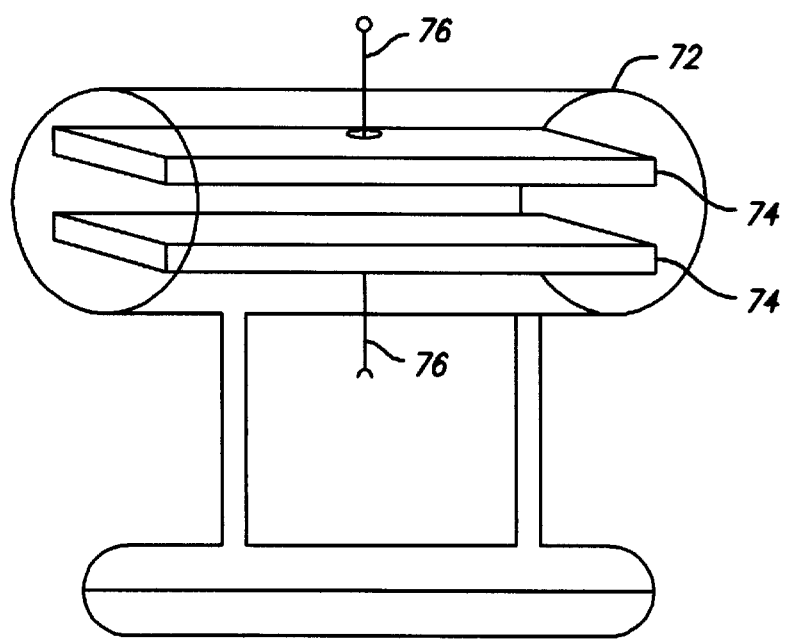
FIG. 6 illustrates a reference cell used for correlation spectroscopy including a Stark-effect modulation cell.

FIG. 6 illustrates another alternative used for modulating a signal generated from within a conventional gas reference or test cell 72 known as Stark-effect modulation. A large electric field is applied via electrodes 74 disposed within the test cell 72 to a gas of polar molecules that splits a quantum-mechanical degeneracy causing the apparent width of the corresponding absorbance lines of the substance within the test cell 72 to increase. An electrical connector 76 connects each electrode 74 to a system (not shown) for modulating the applied electric field to the gas in the cell 72. The intermittently applied electric field of sufficient energy produces a desired modulation within the cell 72. The output signal generated by passing light through the gas in the cell 72 is varied or modulated according to the applied electric field.

The performance of these known test cell filters is not adequate for conducting tests in the field and does not produce sufficiently accurate results to detect relatively low concentrations of substances. Additionally, the modulation techniques cannot be conducted at adequately high frequencies to yield precise results. Furthermore, the equipment necessary to conduct the tests and to modulate the test cells is cumbersome, requiring significant expense and effort to transport and maintain in field applications.

C. Tunable Filter Construction

1. Fiber Optic Tunable Filter

One tunable filter constructed in accordance with the present invention described above and in FIG. 4 is an optical fiber 58 with Bragg gratings A–E formed in the core 54. There are several methods available for forming Bragg gratings in a fiber optic strand. The predominant method is to first provide the polyacrylate cladding 52 over a germano-silicate optical fiber or core 54 and to strip away a portion of the cladding exposing the core. Though five gratings A–E are shown in FIG. 4, the actual number of gratings may vary considerably without departing from the scope of the invention. The actual number depends upon the particular filtering characteristics desired for a particular application.

Figure 7:
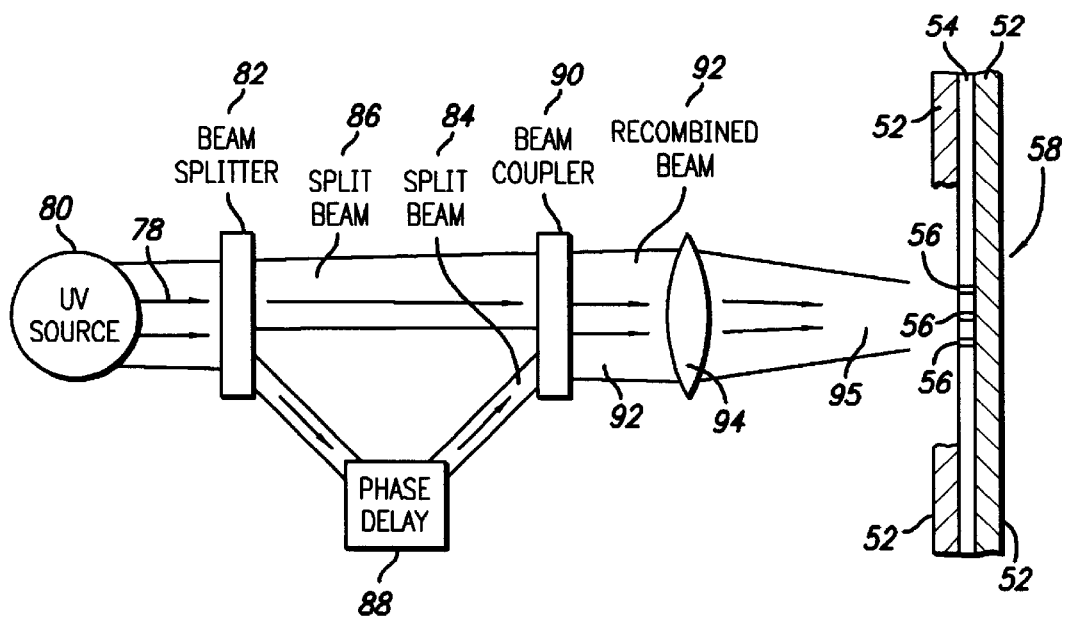
FIG. 7 illustrates a process of providing a single ultraviolet light source at, for example, a wavelength of 245 nm which is split into two identical beams of light.
Figure 8:
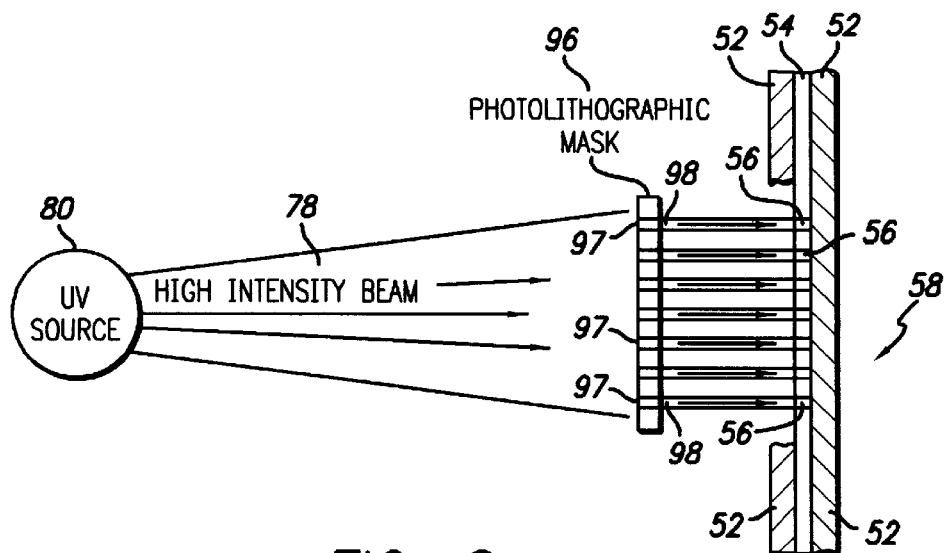
FIG. 8 illustrates an alternative process for fabricating optical fiber Bragg gratings.

FIGS. 7 and 8 illustrate two alternatives for forming the altered or high refractive index regions 56 of the Bragg gratings A–E in the core 54 of the fiber 58. FIG. 7 illustrates a process of providing a single beam 78 from an ultraviolet light source 80, at an exemplary wavelength of 245 nanometers (nm), that is split at a beam splitter 82 into two identical beams 84 and 86 of light. One beam 84 is directed to a phase delay device 88 and then recombined with the other beam 86 at a beam coupler 90 whereby the combined beam 92 passes through an optical element 94 producing a focused beam 95. The interfering focused beam 95 remains incident on the exposed portion of the core 54 for several minutes until a permanent variation 56 in the corresponding refractive index has been established. The number of variations 56 and their spacing depend upon the particular filtering characteristics desired as well as upon the core construction. The process may be repeated in order to form the desired number of gratings and regions 56 for each grating.

FIG. 8 illustrates an alternative process for fabricating an optical fiber 58 including Bragg gratings A–E each composed of altered or high refractive index regions 56. This alternative process includes again exposing the core 54 of the optical fiber 58 by removing a portion of the cladding 52. The exposed portion of the core 54 is then subjected directly to a high intensity beam 78 from an ultraviolet light source 80 through a photolithographic mask 96 or what is commonly known as a phase mask. The mask 96 includes a plurality of openings or a pattern of openings 97 that permit high intensity light 98 to pass through the mask and contact the fiber core. The high intensity light 98 alters the refractive index of the exposed core 54 only where the mask 96 permits exposure of the core to the light 98. Typically, the spacing between the periodic variations or regions 56 in the core refractive index is on the order of 0.5 micrometers ($\mu$m). The total length of each Bragg grating A, B, C, D, or E ranges from about 0.5 to about 2 centimeters. This alternative masking process is a fairly new process. It is believed, without being limited thereto, that the ultraviolet interference patterns actually bleach the oxygen vacancy defect band in the core to create the grating.

The relationship governing the filtering characteristics of an optical fiber having a Bragg grating is:

$$\lambda_B = 2nd \qquad \text{Equation 1}$$

where n is the average refractive index variation of the Bragg grating and d is the grating period. Additionally, the peak grating reflectivity R for a particular mode at $\eta$(B), the wavelength B, is given by the following equation:

$$R = \tanh^2\left(\frac{\pi L \cdot \Delta n \cdot \eta(V)}{\lambda_B}\right) \qquad \text{Equation 2}$$

where L is the grating length, $\Delta$n is the magnitude of the grating index variation, and $\eta$(V) is a function of the waveguide parameter V that represents a fraction of the integrated mode intensity within the fiber core. Originally, the first Bragg gratings were created holographically using frequency doubled noble-gas/halide pumped dye lasers as coherent sources of ultraviolet light. While this technique remains important, particularly when one of a kind gratings are being studied, direct writing of gratings by exposing fibers to ultraviolet energy through high resolution optical masks is now possible and more suitable to mass production manufacturing. This particular technique is very well suited to low cost mass production of fiber optic Bragg gratings and particularly useful for the present invention.

2. Integrated Optics Planar Waveguide Filter

Figure 9:
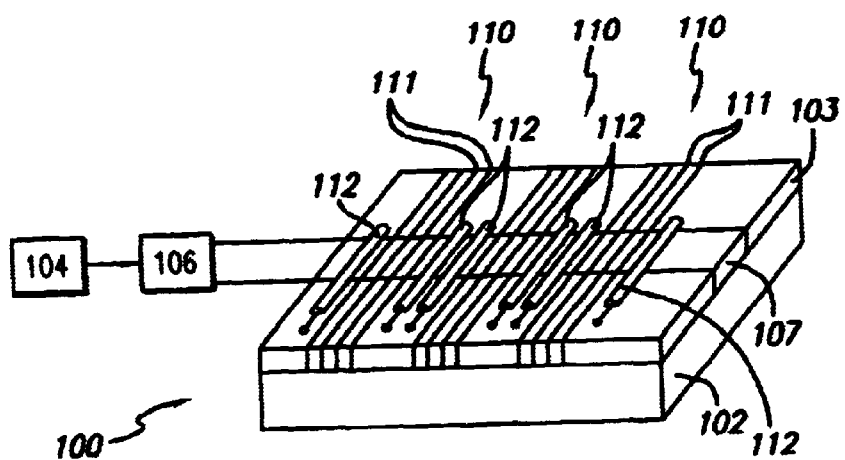
FIG. 9 illustrates one alternative embodiment of an optical waveguide constructed in accordance with the present invention utilized to filter selected wavelength bands from a light source.
Figure 10:
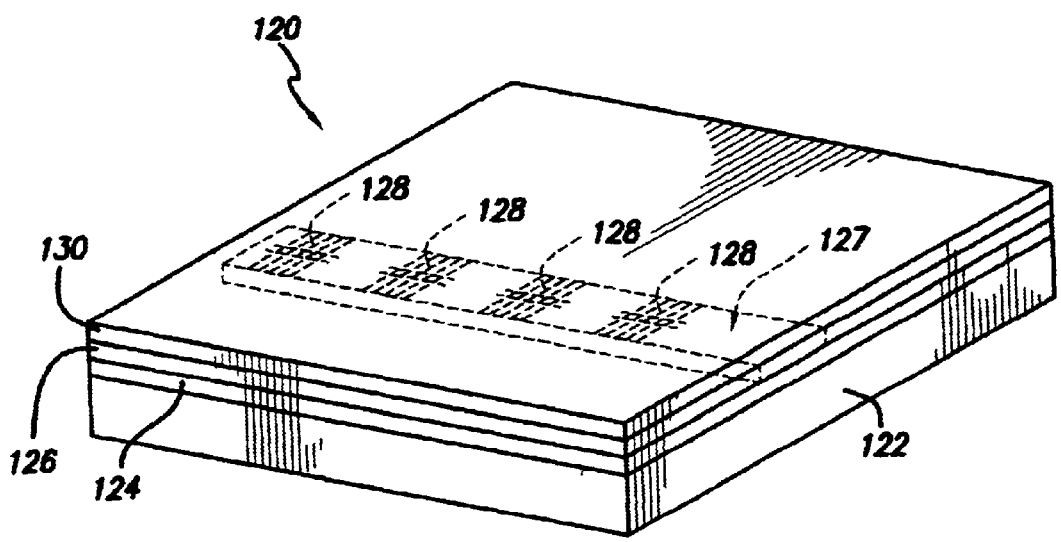
FIG. 10 illustrates another alternative embodiment for an optical waveguide constructed in accordance with the present invention.

FIGS. 9 and 10 illustrate two alternative optical filters or waveguides that provide suitable controlled variation or selection in the refractive index. These optical waveguides can be used as substitutes for the previously described optical fiber 58 including the Bragg gratings A, B, C, D, and E. FIG. 9 illustrates one embodiment of an optical planar waveguide useful as a suitable filter in accordance with the present invention. The optical waveguide in FIG. 9 is an integrated optics (IO) matched filter 100, which is a complex device having a number of discrete components formed by complex processes not described in detail herein.

The IO filter 100 includes a planar base substrate 102, which in one embodiment is formed from a glass or silicon material with a glass film layer 103 formed thereon. The IO filter 100 is illuminated by an LED 104 or other light source that produces a beam of light coupled to and transmitted through a light guiding structure 107. In one embodiment, the light signal is coupled to the IO filter 100 through a light collimator 106 forming a controlled collimated beam of light transmitted through the guiding structure 107. The collimated light beam is transmitted through one or more gratings 110 formed in the glass film layer in conjunction with the light guiding structure.

The light guiding structure 107 is the core waveguide material and is formed in the upper glass film layer. The guiding structure 107 transmits light according to predetermined characteristics and has a nominal core refractive index. A photosensitive material is added to the film layer 103 upon its formation and, using photolithographic techniques, altered upon selective exposure to light energy to define the core of the light guiding structure 107 and its particular path in the film layer 103.

The gratings 110 are formed in the upper film layer 103 of the substrate near the surface, also using photolithography. Each grating 110 has a number of regions 111 with an altered refractive index. Depending on the particular formation of the grating pattern, the gratings 110 reflect certain wavelengths of the light passing from the collimator 106 and allow all other wavelengths to pass through light guiding structure 107, similar to the fiber optic waveguide 58 described above. In one embodiment, each of the gratings 110 includes a modulator 112 for modulating the spacing between regions 111 to intermittently shift the refractive index of the gratings. The gratings 110 are modulated by applying an electric field across one or more of the gratings as desired.

The IO matched filter 100 can take on many different constructions without departing from the scope of the invention. However, the IO filter 100 produces predetermined waveband spectra that simulate one or more selected substances or specimens. For example, the gratings 110 can be formed as one individual grating, multiple gratings, or complex multiple gratings, depending on the type or number of substances to be detected by the IO filter. Additionally, the substrate 102 can be formed having a silicon base material with the glass film 103 formed over the substrate. The gratings 110 are formed in the glass film 103 and are electrically connected to other components (not shown) of the IO filter 100 through the silicon material as is known in the art. Alternatively, the substrate 102 can be formed from an all glass material having a sol gel layer 103 formed thereon that includes the gratings 110.

3. Layered Planar Optical Waveguide Filter

FIG. 10 illustrates another embodiment of an optical waveguide that can be utilized as the filter according to the invention. The waveguide is in the form of an optical planar layered waveguide 120 that incorporates an integral modulator as a portion or layer of the waveguide. A base substrate material of a piezoelectric material, a bimorph material, or a suitable electromechanical material is first provided as a modulator substrate layer 122. A non-conductive or insulating buffer layer 124 is disposed over the modulator substrate layer 122 to insulate other layers from the modulator substrate layer 122 and any electric current or other energy applied to the modulator substrate layer 122 during operation of the device.

A photosensitive material layer 126 is disposed over the buffer layer 124 and carries a desired core waveguide structure 127 and plurality of gratings 128 or a suitable grating pattern therein. The core waveguide structure 127 and gratings 128 are formed in the photosensitive layer 126 photolithographically, as described above referring to FIG. 9, to produce the desired light guiding and filtering characteristics. The photosensitive layer 126 in one embodiment is formed from a suitable polymer material including a photosensitive material additive. It is possible to form gratings or other types of local refractive index variations in such polymer materials within a planar format by using photolithographic techniques.

A top cladding layer 130 is disposed over the photosensitive layer 126 in order to protect it from damage. The cladding layer also protects both the light guide structure 127 and gratings 128. The cladding layer 130 also provides suitable light transmittance and reflective characteristics for the optical waveguide 120 as a whole.

In this embodiment, light is input into one end of the waveguide 120 via the light guide or waveguide structure 127 having a core refractive index with known wavelength or waveband characteristics. The light energy, either reflected back by the gratings 128 or passed through the waveguide 127, exhibits the predetermined characteristic wavelengths according to the number and configuration of the gratings 128 in the photosensitive layer 126. This type of optical waveguide 120 is suitable as an alternative optical waveguide filter for use in the invention.

As will be evident to those skilled in the art, and as will become apparent upon further description of the invention, other constructions may be known or may become known which may be suitable as a tunable filter for the invention. Bragg gratings are not the only localized periodic variations in the refractive index that can be utilized for providing the filtering function of the waveguides for the present invention. Other types of refractive index variations are known or may become known that are suitable for tunable filter applications.

D. Modulation Techniques

There are a number of methods and devices that can be used to intermittently modulate the spectral output characteristics of the optical waveguide filters described above. Again, the term "output" can mean either the light energy exiting the output end of the waveguide structure or the light energy reflected back to the input end.

FIGS. 11–18 illustrate a number of different embodiments that can be utilized to modulate the refractive index of an optical waveguide. These embodiments are described in conjunction with the optical fiber waveguide 58 described above. Modulation can be created by periodically applying tension or some other external force to the optical waveguide gratings or other refractive index variation. Alternatively, modulation can be created by subjecting the optical waveguide to modulated microwave energy or periodic electrical energy or by placing the waveguide within an energy resonant structure.

1. Fiber Wrapped Around Circumference of Piezoelectric Cylinder

Figure 11:
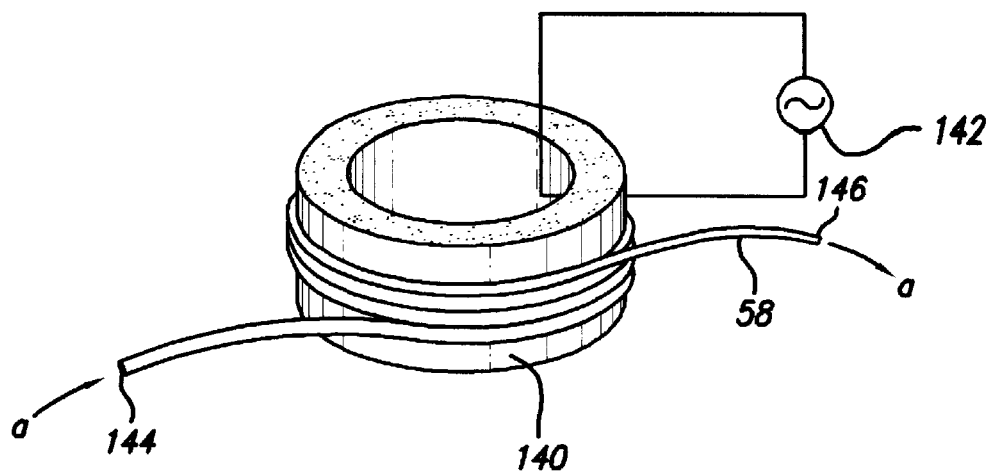
FIG. 11 illustrates one embodiment of an apparatus for modulating the refractive index of an optical waveguide utilizing a piezoelectric cylinder.

FIGS. 11–15 illustrate several embodiments for periodically stretching an optical waveguide in the form of the optical fiber 58 to modulate the spacing between the altered refractive index variations 56 of the Bragg gratings A, B, C, D, and E and thus modulate the spectral output characteristics of the fiber. One technique is illustrated in FIG. 11. The optical fiber 58 is tightly wrapped around a piezoelectric cylinder 140. The cylinder 140 is coupled to a signal generator 142 to apply a voltage to the cylinder. The signal generator 142 is operated to apply a periodic voltage to the cylinder 140 which in turn changes the circumference of the cylinder, effectively stretching the optical fiber 58. The actual length of the fiber 58 is not of particular concern. The intermittent change in the period or spacing of the individual altered refractive index regions 56 modulates the light filtering capability of the fiber. Light energy enters the fiber 58 at a fiber input end 144 and exits the fiber at an output end 146 in the direction of the arrows "a". The waveband characteristics of the light energy are changed by the gratings A, B, C, D, and E in the fiber and modulated by altering the spacing between the altered refractive index regions 56 of the gratings via expansion and contraction of the cylinder.

Piezoelectric materials are commercially available that undergo linear dimensional changes on the order of 0.05% at frequencies up to 200 Hz when fully biased, for example, at 75 volts. It is known that the operating wavelengths of the fiber Bragg gratings A, B, C, D, and E are linearly related to the period of the regions themselves, i.e., the distance between areas of higher refractive index in each grating. Therefore, modulating the period of the regions 56 of the gratings A, B, C, D, and E modulates the operating wavelengths of the fiber by a proportional amount. For example, changing the optical path length in the fiber at the location of the Bragg gratings by 0.02% causes a change of 0.02% in the wavelength of operation for the particular fiber. For a wavelength in the 1330 nm band of the methane spectrum, for example, this corresponds to a shift of about 0.25 nm. This shift is significantly larger than the width of the rotational fine structure peaks of the methane, typically on the order of about 0.1 nm, as shown in FIG. 2. Therefore, it is possible to modulate the absorbances of the tailored filter completely out of phase and completely back into coincidence with the peaks of the methane spectrum. By doing so periodically, it is possible to highly fine tune the filter output to yield extremely accurate results.

2. Fiber Passing Through Piezoelectric Cylinder

Figure 12:
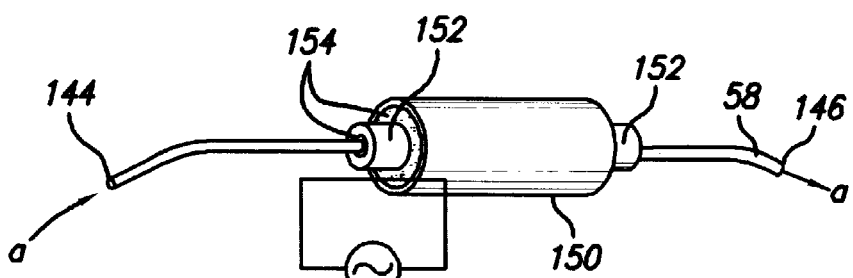
FIG. 12 illustrates another embodiment of an apparatus for modulating the refractive index of an optical waveguide utilizing an axially disposed piezoelectric cylinder around the waveguide.

FIG. 12 illustrates another alternative embodiment for modulating the refractive index of the optical waveguide 38 in the form of an optical fiber 58 by stretching the fiber. In this embodiment, the fiber 58 extends axially through a piezoelectric cylinder 150 that externally surrounds the fiber. A glass capillary tube 152 is secured to the fiber 58 with a suitable adhesive layer 154 such as an epoxy and disposed axially within the piezoelectric cylinder 150. The external surface of the capillary tube 152 is adhered by a suitable adhesive layer 154 to the interior of the cylinder 150. A signal generator 156 is coupled to the piezoelectric cylinder 150 and subjected to a voltage causing the cylinder to lengthen. Because the cylinder 150 is adhered indirectly to the fiber 58 through the adhesive layers 154 and capillary tube 152, the fiber is subjected to axial tension and is stretched. This varies the refractive index at the gratings A, B, C, D, and E of the fiber, where the gratings are disposed beneath the glass capillary tube 152.

3. Fiber Passing Through Metal Coated Polyvinylflouride Jacket

Figure 13:
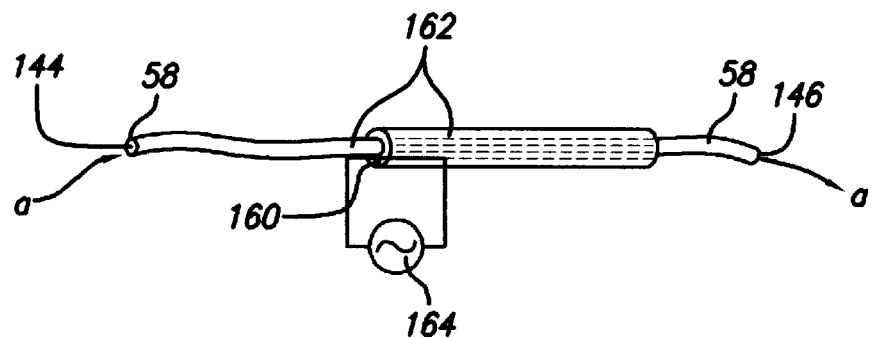
FIG. 13 illustrates another embodiment of an apparatus for modulating the refractive index of an optical waveguide having a piezoelectric material surrounding and bonded to the waveguide in an axial manner.

FIG. 13 illustrates another alternative embodiment for adding tension to the optical waveguide 38, again shown as an optical fiber 58. In this embodiment, a radially pulled $PVF_2$ (polyvinylflouride) jacket 160 is disposed over and axially along a portion of the fiber 58 covering the gratings A, B, C, D, and E. A metal film 162 is disposed over the exterior surface of the jacket 160 and also onto a portion of the fiber 50 adjacent the ends of the jacket 160. A signal generator 164 is connected to the metal film 162 on both the jacket 160 and the fiber 58 adjacent the ends of jacket for subjecting the apparatus to a periodic voltage. As the voltage is applied, the metal film and jacket are stretched longitudinally which in turn stretches the fiber subjecting the altered refractive index regions 56 of the gratings to a spacing or period change and thus a change in the refractive index.

4. Fiber Carried on Surface of Bendable Cantilevered Beam

Figure 14:
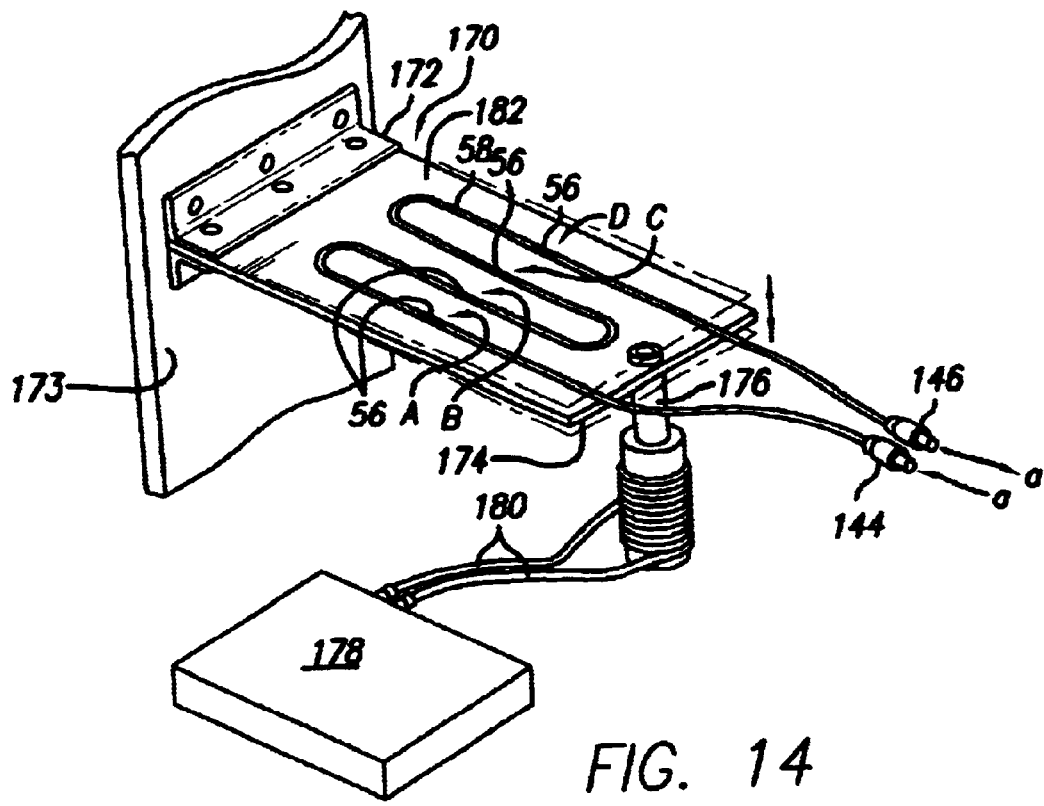
FIG. 14 illustrates another embodiment of an apparatus for modulating the refractive index of an optical waveguide having a cantilevered beam and an electromagnetic actuator for bending the beam.

FIG. 14 illustrates another alternative embodiment for modulating the spacing of the Bragg gratings 56 on an optical fiber matched filter 58. In this embodiment, instead of utilizing a piezoelectric material, the fiber 58 is mechanically and intermittently stretched to alter the spacing or period of the Bragg gratings 56. A cantilevered beam 170 has a fixed end 172 mounted to a surface 173. The beam 170 also has a distal or free end 174 opposite the fixed end 172 and spaced from the surface 173. An electromagnetic actuator 176 is connected to the free end 174 and is electronically driven by an electronic driver 178 connected via cables 180 thereto.

The optical fiber matched filter 58 is mounted to one surface 182 of the beam 170 and affixed thereto. The fiber 58 is mounted to the beam 170 in a sinusoidal curved manner although other orientations and constructions are possible without departing from the scope of the invention. A plurality of the Bragg gratings A, B, C, and D are located transversely adjacent to one another. One set of gratings are disposed on each portion of the curved fiber, as illustrated in FIG. 14, so that each grating and its individual altered refractive index regions are subjected to the same amount of period change. The electronic driver 178 is periodically energized to selectively manipulate the actuator 176 in order to move the free end 174 of the beam 170 up and down as indicated by the arrow "b" to apply tension and thus to stretch the fiber.

Alternatively, it may be desired that one or more particular sets of the Bragg gratings A, B, C, or D experience a different period change than the other gratings. To accomplish such variations, the gratings A, B, C, or D can be disposed at different positions along the top surface 182 of the beam 170 relative to the other gratings. Gratings nearer the fixed end 172 of the beam 170 will undergo more stretching than gratings located nearer the free end 174.

5. Fiber Attached to Surface of Bimorph Planar Element

Figure 15:
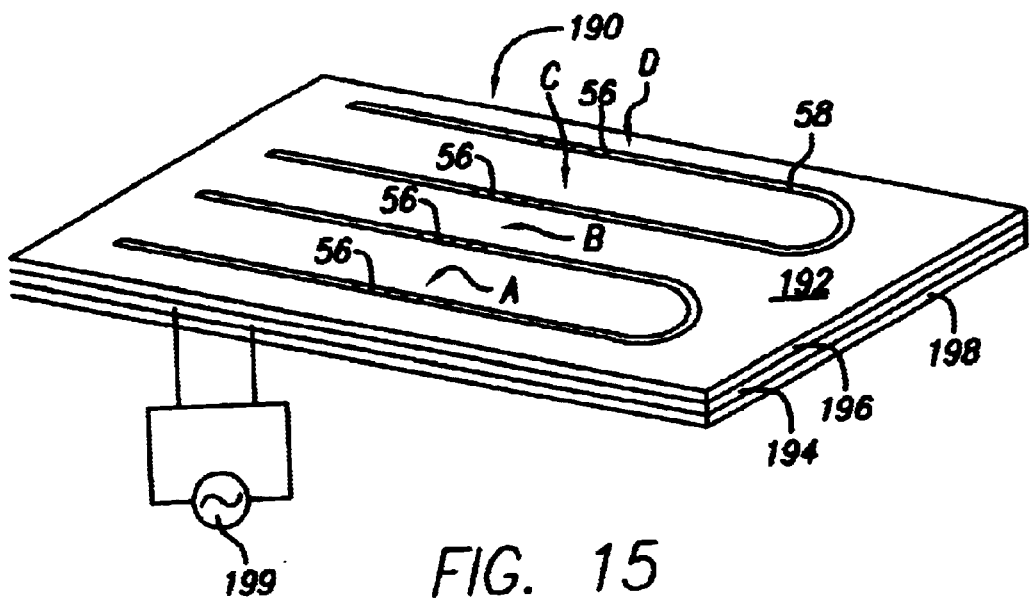
FIG. 15 illustrates another embodiment of an apparatus for modulating the refractive index of an optical waveguide having the waveguide mounted directly to a piezoelectric bimorph material.

FIG. 15 illustrates another alternative embodiment similar to that of FIG. 14 where an optical fiber matched filter 58 is mounted to a planar element 190 on a first surface 192 of the planar element. In this embodiment, the planar element 190 is fabricated from a bimorph material of a layered construction. A piezoelectric material layer 194 is disposed between the two non-conductive or insulating layers of material 196 and 198. A signal generator 199 applies a periodic electric field to the piezoelectric layer 194 to intermittently alter a physical characteristic of the bimorph planar element 190. Similar to the manner described for FIG. 14, the bimorph element bends according to the applied electric field and piezoelectric layer 194. The physical change to the bimorph element 190 applies a tension to stretch the fiber to increase the spacing of the regions 56 of the gratings A, B, C, and D and thus intermittently alter the refractive index of the waveguide.

6. Fiber Passing Through Hollow Metal Waveguide

Figure 16:
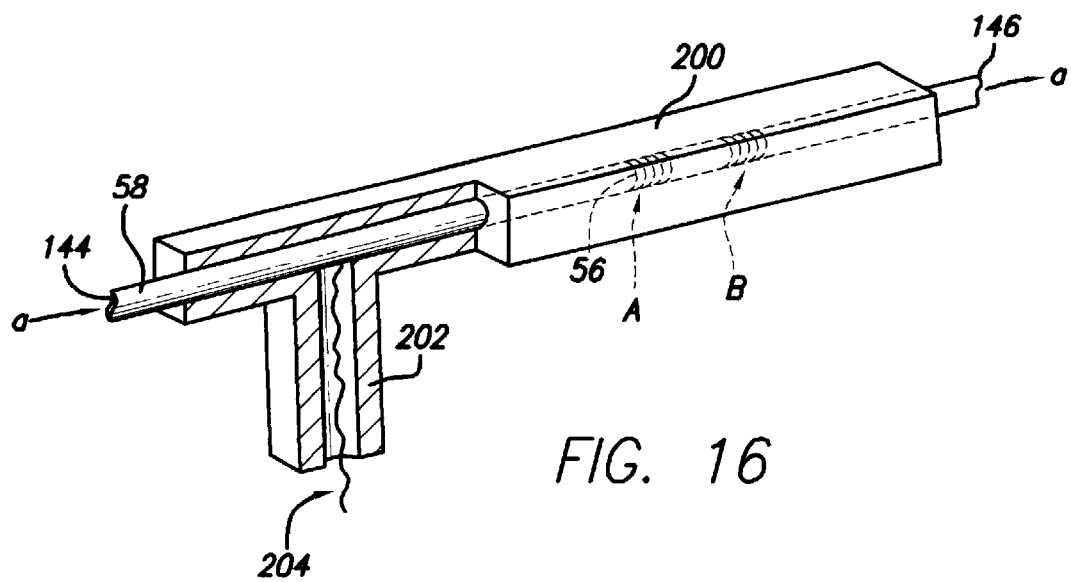
FIG. 16 illustrates another embodiment of an apparatus for modulating the refractive index of an optical waveguide having a structure extending through a hollow metal waveguide through which microwave energy is input and modulated.

FIG. 16 illustrates another alternative embodiment for modulating a characteristic of the periodic variation, such as the Bragg gratings, to thus intermittently shift the refractive index of an optical waveguide. In this embodiment, the optical waveguide is again illustrated as an optical fiber matched filter 58 including a pair of Bragg gratings A, and B. In this embodiment, the modulator is a hollow metal waveguide 200 through which the fiber 58 runs. This type of device is typically utilized for relatively high optical frequencies such as in the range of about 1014 kHz. An energy inlet 202 is connected to the tube 200 for receiving modulated microwave energy 204. The modulated energy is provided in this embodiment on the order of about 1 GHz and is run along the length of the metal waveguide 200. The microwave energy propagates or travels as a resonant wave in the hollow tube surrounding the fiber and creates a Kerr effect that alters the period of the altered refractive index regions 56 of the Bragg gratings A, and B. Modulation of the microwave energy intensity changes the size of the Kerr effect and thus modulates the refractive index of the gratings to effect an intermittent shift in the refractive index of the waveguide.

7. Fiber Installed in a Strip Line Device

Figure 17:
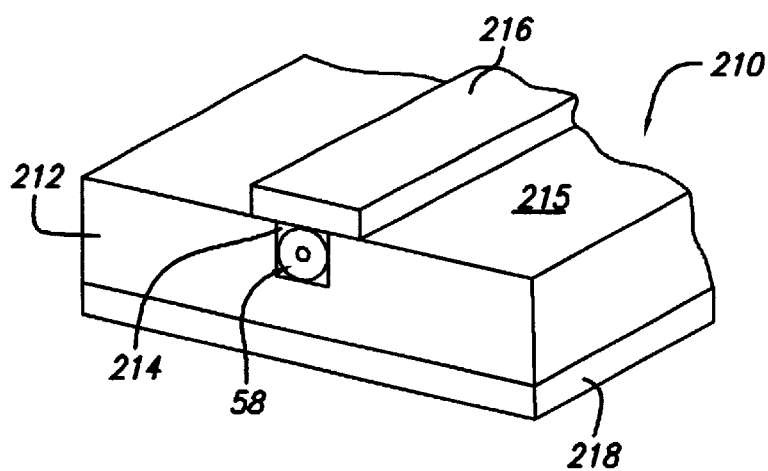
FIG. 17 illustrates another embodiment of an apparatus for modulating the refractive index of an optical waveguide having the waveguide extending in a dielectric material between two electrodes.

FIG. 17 illustrates another alternative embodiment of a tunable waveguide filter in the form of an optical fiber matched filter 58 installed in a strip line device 210. The strip line device 210 is utilized to modulate one or more characteristics of the optical fiber 58 in order to change the refractive index of the gratings in the fiber. The strip line device 210 includes a dielectric material substrate 212 having an elongate groove 214 formed longitudinally along an upper surface 215 of the dielectric material. The optical fiber 58 is disposed within the groove 214 and covered by a strip of material 216. The opposite surface of the dielectric material 212 includes an electrode layer of material 218. An electric field is periodically applied to the electrode layer 218 and transmitted by the dielectric material 212 to the fiber 58. Again, through the Kerr effects, the intermittent electric field causes a change in the refractive index of the gratings of the optical fiber and thus an intermittent shift in the refractive index of the waveguide or strip line device 210.

8. Fiber Passing Through a Resonant Cavity

Figure 18:
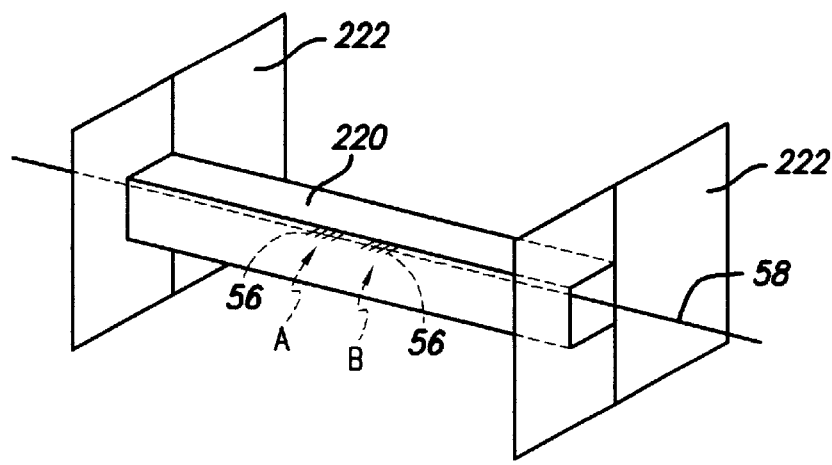
FIG. 18 illustrates another embodiment of an apparatus for modulating the refractive index of an optical waveguide having the waveguide mounted in a hollow electrical waveguide further mounted between a pair of reflectors to form a resonant cavity.

FIG. 18 illustrates another alternative embodiment wherein the tunable filter optical waveguide is in the form of a fiber optic matched filter 58 again having a pair of Bragg gratings A and B. The optical fiber 58 is disposed longitudinally through a hollow metallic waveguide structure in the form of a resonant waveguide 220. A reflector 222 is disposed at each end of the waveguide 220 to provide a resonant cavity along the waveguide structure. Resonant energy applied to the waveguide forms a standing electromagnetic wave in the cavity which periodically alters a physical characteristic of the gratings to cause an intermittent shift in the refractive index at the gratings of the optical fiber 58. The energy applied to the waveguide can be microwave energy, an applied electric field, an applied magnetic field, or the like.

In each of the above embodiments, the modulator is utilized to apply stress (FIGS. 11–15) or energy (FIGS. 16–18) to the optical waveguide in a manner that intermittently changes a physical characteristic of the waveguide. The change in the physical characteristic causes an intermittent shift of the altered refractive index at the periodic variations in the waveguide. Modulation of the periodic variations in the refractive index intermittently shifts the characteristic wavelengths of the Bragg gratings A, B, C, D, and/or E. This is done in order to filter out signal noise in the spectral characteristics of the light transmission of the waveguide. Thus, it is possible to produce a much more accurate and sharp reading from the tunable waveguide filter.

E. Light Sources

The type of light source utilized to provide input light energy for the tunable filters of the invention can vary considerably without departing from the spirit and scope of the invention. Possible light sources include virtually any source such as a standard incandescent or other such bulb, a light emitting diode (LED), a laser diode, a collimated light source, a laser fiber, or the like. The light source must simply transmit light energy to the input end of an optical waveguide of the invention suitable to produce a desired waveband spectra emission.

F. Experimental Operation of Tunable Filter Construction

Figure 19:
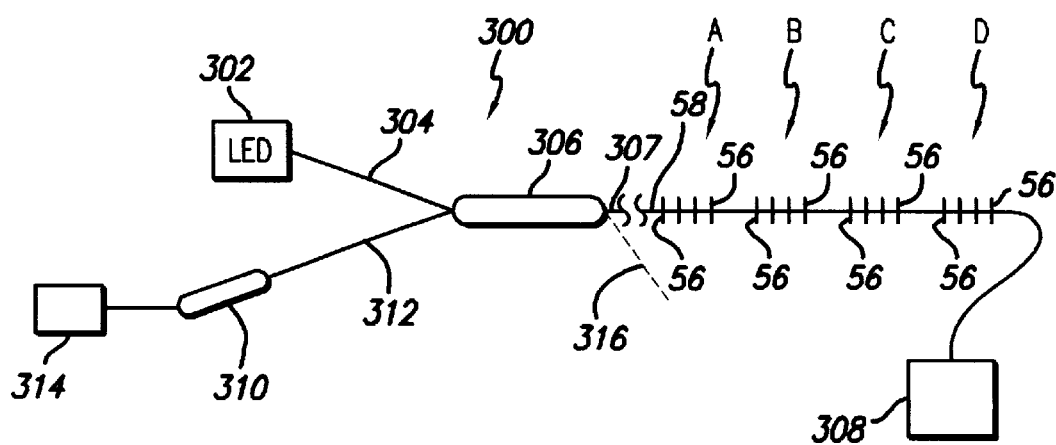
FIGS. 19 illustrates a schematic representation of a tunable filter assembly for detecting the presence of a substance in an environment and including an optical fiber matched filter constructed in accordance with the invention.
Figure 20A:
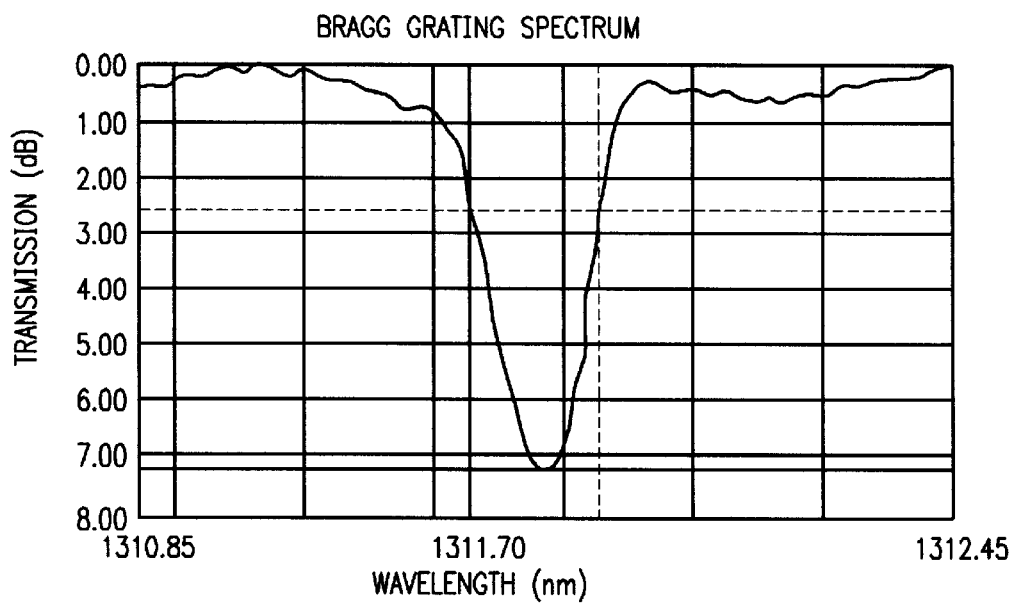
FIG. 20A, 20B, 20C and 20D illustrate a chart representing of a transmission spectrum produced by four fiber optic Bragg gratings represented in the device shown in FIG. 19.
Figure 20B:
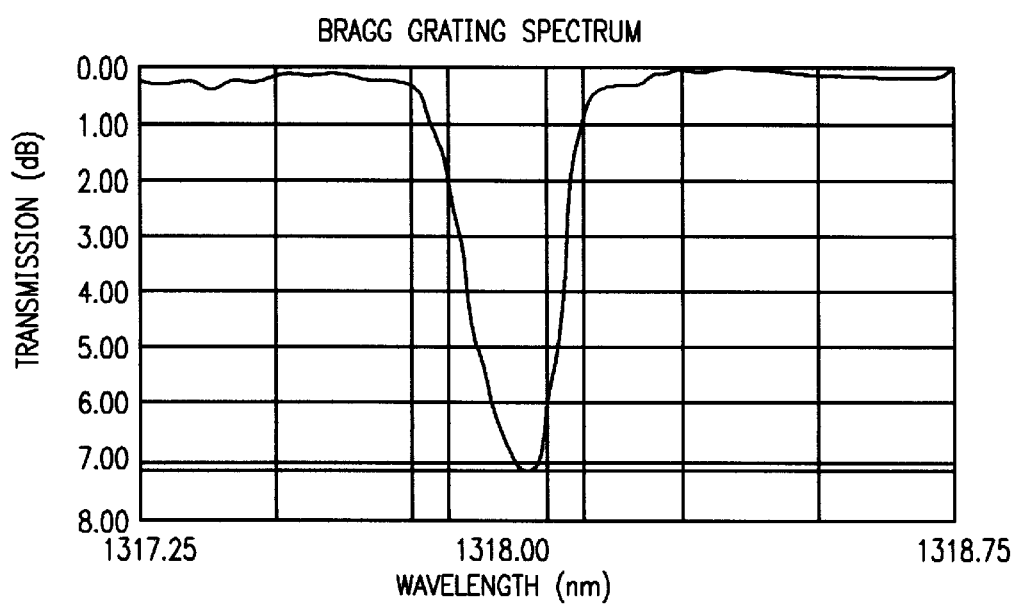
Figure 20C:
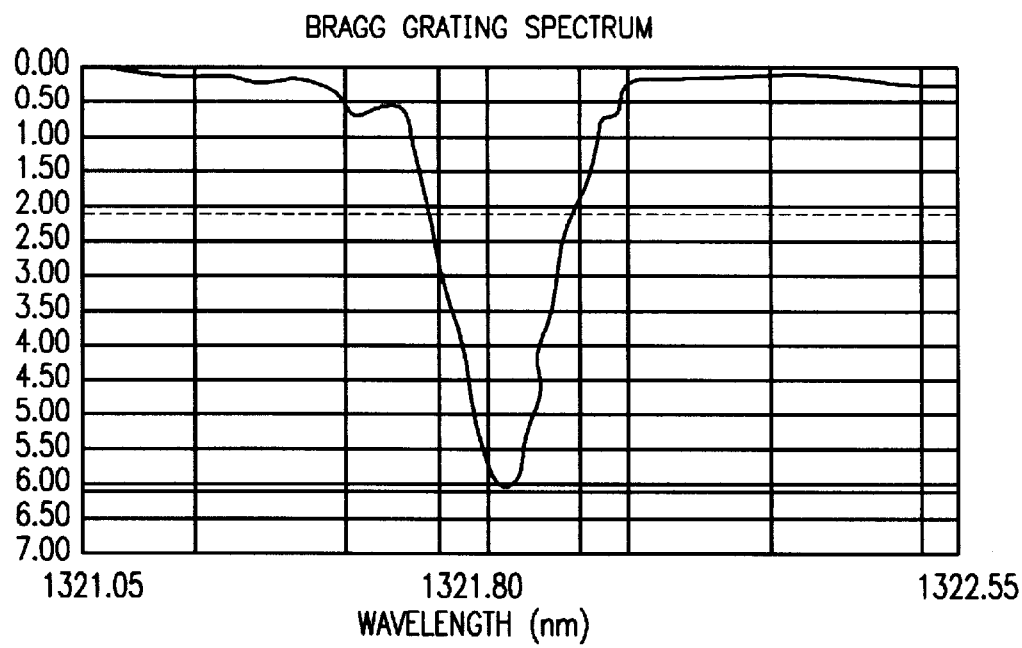
Figure 20D:
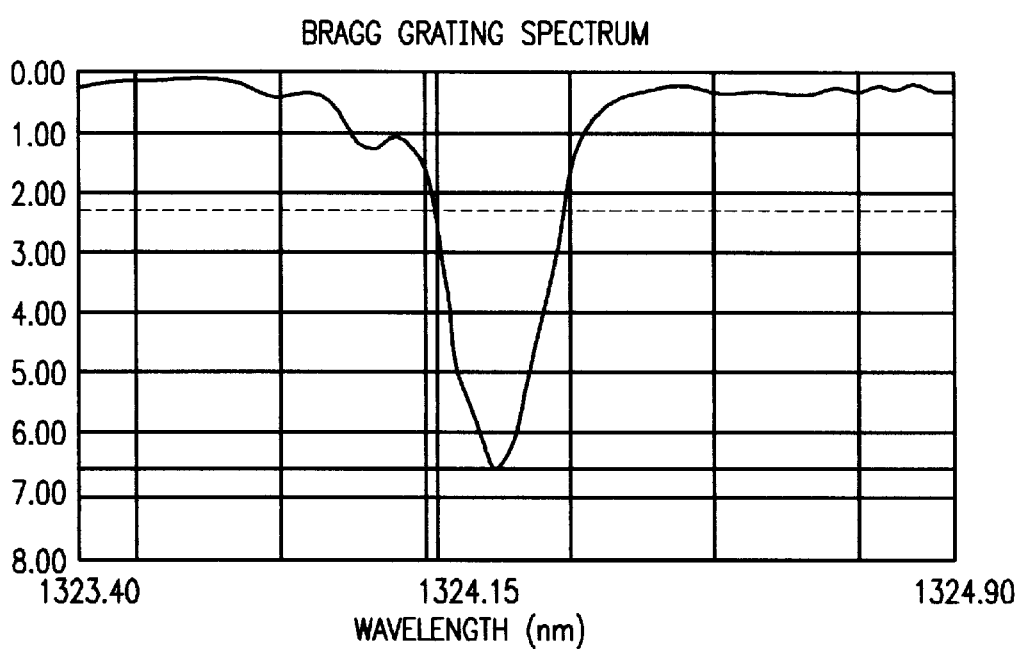

FIG. 19 illustrates an exemplary schematic of a tunable filter assembly 300 that uses either the light energy passing through and exiting at the output end of a fiber optic matched filter or the light energy reflected back to the input end of the filter. The device 300 includes an LED light source 302 connected via an optical fiber to one branch 304 of a two-by-two (2×2) optical coupler 306. A tunable matched fiber optic filter 58 includes a number of gratings A, B, C and D and extended from another branch 307 of the coupler 306. A signal detector 308 is optically coupled to the output end of the fiber 58 for detecting the light energy downstream of the Bragg gratings A–D. A light collimator 310 is connected to a third branch 312 of the coupler 306 for collimating the light output reflected by the fiber Bragg gratings. A second signal detector 314 is optically coupled to the collimator 310 for detecting light reflected by the Bragg gratings A–D. A fourth branch 316 of the coupler 306 is unused in device 300.

For experimental analysis, a combination wavelength band of $v_2+v_3$ at 1300 nm was tested because of the availability of convenient light sources and fiber gratings useful for this wavelength range. Additionally, these readily available components are fairly inexpensive when compared to other technologies. The LED 302 selected for the experiment was a high brightness InGaAs LED. The fibers were single mode fibers, fiber couplers and fiber Bragg gratings. The tunable filter assembly 300 was built to match R(3), R(4), R(6), and R(9) vibration branches of the $v_2+2v_3$ wavelength bands 1312 nm, 1318 nm, 1321 nm, and 1324 nm shown in FIG. 2. These were selected because these bands correspond closely to telecommunication wavelengths. Their absorption strengths are approximately half that of the Q vibration at 1331 nm, and a factor of five smaller than that of the 1665 nm absorption bands. The fiber Bragg gratings were purchased from "3M Bragg Grating Technologies" in Bloomfield, Connecticut. The light source 302 was further purchased from "Epitaxx" as Model No. ETX 1300RFC. The fiber collimator 310 was coupled by the third branch 312 to the 2×2 coupler and was a "Dicon" fiber collimator. The 2×2 coupler 306 was purchased as a single mode fiber optic coupler from "Gould".

The fiber optic matched filter 58 was used in reflection to produce wavelength modulated light energy reflected by the gratings A–D and detected by the signal detector 314. For this experiment, the signal detector 308 was not used. Wavelength modulation was achieved by stretching the fiber gratings A, B, C, and D sufficiently to shift the refractive index wavelength of the gratings at least half of a bandwidth and half again at an appropriate rate. The bandwidth of the Bragg gratings for the experiment was 0.22 nm. Fiber Bragg gratings respond to strain following an equation 3 as follows:

$$\Delta\lambda/\lambda = 0.76\epsilon, \quad \text{Equation 3}$$

where $\epsilon$ is the uniaxial strain applied to the fiber grating. To shift the grating by 0.22 nm at a wavelength of 1300 nm, the applied strain must be approximately 200 $\mu\epsilon$.

For this experiment, two modulation approaches were examined including piezoelectric and electromagnetic actuators. The Bragg gratings A, B, C, and D were obtained to match the spectral fingerprint of methane. The first approach utilized piezoelectric actuators to uniaxially and periodically stretch the fiber gratings to modulate the methane matched filter assembly 300. To accomplish this, a P840.60 piezoelectric 60 actuator purchased from "Physik Instruments" was utilized. When driven by a sufficiently high power amplifier, the actuator can produce the desired amount of strain in the fibers with an acceptable frequency response. Such an actuator was constructed according to that described above for FIG. 11. Conventional piezoelectric electric elements typically produce small displacements, for example on the order of 10 to 100 $\mu$m. The displacements are applied directly at the fiber gratings and axially along the fiber to change the spacing between the periodic variations 56 in the refractive index.

The second approach utilized an electromagnet to produce large displacements on the order of several millimeters in the Bragg gratings of the optical fiber 58. Electromagnets driven by high power amplifiers can achieve displacements to uniaxially stretch a fiber grating in a similar manner to a piezoelectric actuator. However, an electromagnet can also be used to bend a small supported beam as described above with regard to FIG. 14, and any fiber grating bonded to it is thus stretched accordingly. The bending of the beam can produce large compressive and tensile stresses on a fiber bonded to a surface of the beam.

Four separate Bragg gratings A, B, C, and D were included in the exemplary tunable filter 58 as illustrated in FIG. 19. The individual fiber Bragg gratings A–D were each characterized by measuring their transmission spectra that are represented by the graphs of FIGS. 20a–20d. Each Bragg grating was measured separately. Table 1 resents the individual fiber Bragg grating characteristics noted for each grating.

TABLE 1

| Grating # | Center Wavelength (nm) | Bandwidth (nm) | Reflectivity (dB) | Resolution (nm) |
| --- | --- | --- | --- | --- |
| 1 | 1311.68 | 0.24 | −6.77 | 0.1 |
| 2 | 1317.94 | 0.23 | −7.03 | 0.1 |
| 3 | 1321.77 | 0.24 | −5.98 | 0.1 |
| 4 | 1324.12 | 0.22 | −6.34 | 0.1 |

Figure 21:
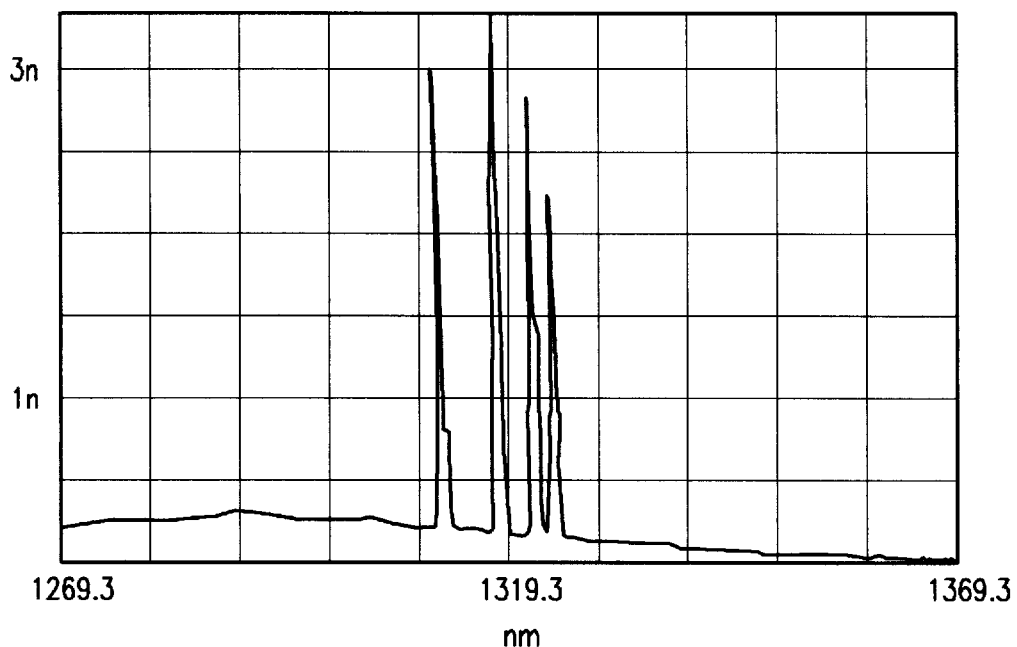
FIG. 21 illustrates a chart representing a reflection wavelength spectrum of the four Bragg gratings of the filter shown in FIG. 19.

FIG. 21 illustrates the reflection spectrum from the assembled matched fiber optic filter where each spike in the graph represents one of the Bragg gratings. The wavelenght modulated light source was characterized for output power using a HP 8153A power meter and spectrum output. The source's output spectrum was essentially identical to the reflection from the matched filter. The output power measured at the detector 314 of the experimental device was −38.5 dBm, or 140 nW.

The most suitable modulation technique for the particular experimental matched filter was a linear fiber stretcher as shown in FIG. 14. The device is allow a variable amount of pre-tension to be applied to each individual fiber Bragg grating 56 in order to tune the wavelength to precisely match the target rotational absorbance line of methane. In use of such a device, the fiber Bragg gratings may only be tuned to longer wavelengths. The matched filter optical fiber 58 can be bonded with cyanoacrylate adhesive and strain-relief tape to a piece of acrylic plastic used as the beam 170. One end 172 of the modulator beam can be clamped to the rigid frame 173 and the other end 174 can be attached with a screw to an electromagnetic actuator 176. The actuator utilized can be similar to those found in audio speakers. The actuator can force a bending mode in the beam to impart a strain upon the bonded fiber filters. The dimensions of the beam and mechanical coupling to the actuator in the experimental analysis can restrict the operating frequency to a range of about 40 Hz to 500 Hz.

Figure 22:
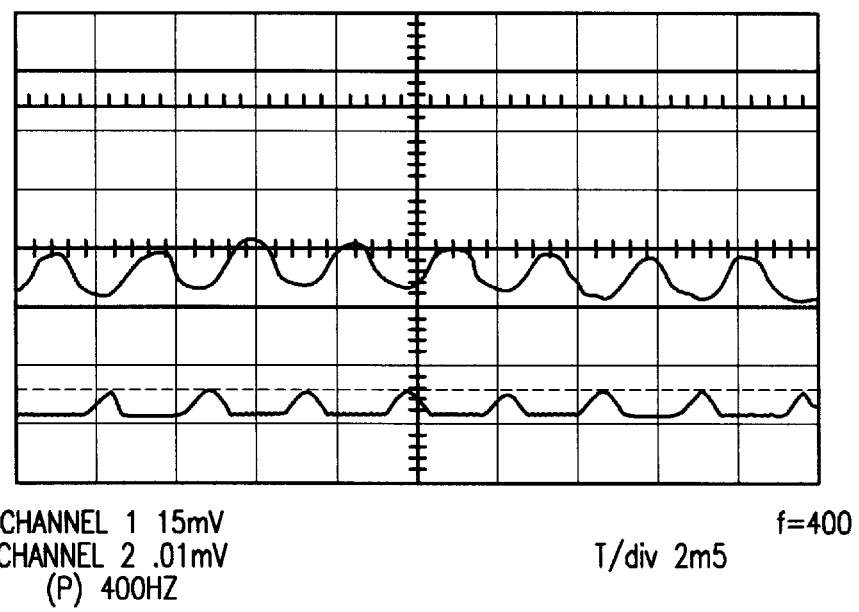
FIG. 22 illustrates a chart representing the modulation response of the matched filter shown in FIGS. 19 and 21 at a modulation frequency of 400 Hz.

For experimental purposes, the wavelength modulation of the matched fiber optic filter was characterized as a function of the modulation frequency. A distributed feedback laser was tuned to each reflection line in the matched filter. The fiber Bragg gratings A, B, C, and D were modulated using the supported beam and electromagnetic actuator illustrated in FIG. 14. The tuned laser was launched into the fiber filter and the reflected signal was detected using a photodiode with a transimpedence amplifier. The detected signal was measured using an oscilloscope for a single line and for varying modulation frequencies ranging between 40 and 500 Hz. A maximum modulation of the gratings occurred at about 90 Hz. FIG. 22 illustrates one example of the measured modulations at an exemplary frequency of about 400 Hz wherein the upper curve represents the optical signal and the lower curve represents the electrical drive signal. The periodic variations in the upper curve correspond to the modulation of the reflectance peak of one of the Bragg gratings into and out of coincidence with the laser wavelength.

Figure 23:
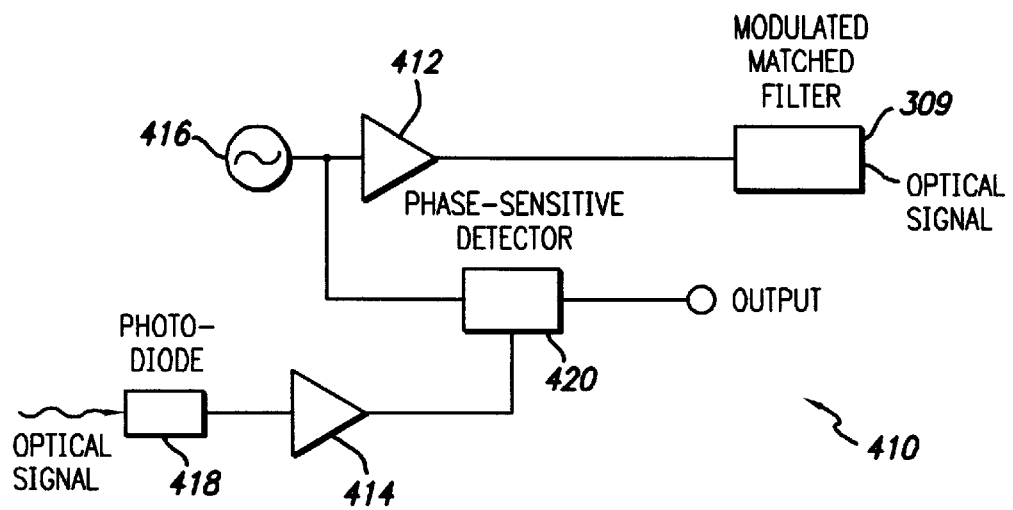
FIG. 23 illustrates a schematic representation of the detection electronics for a correlation spectroscopy demonstration device constructed in accordance with the invention.
Figure 24:
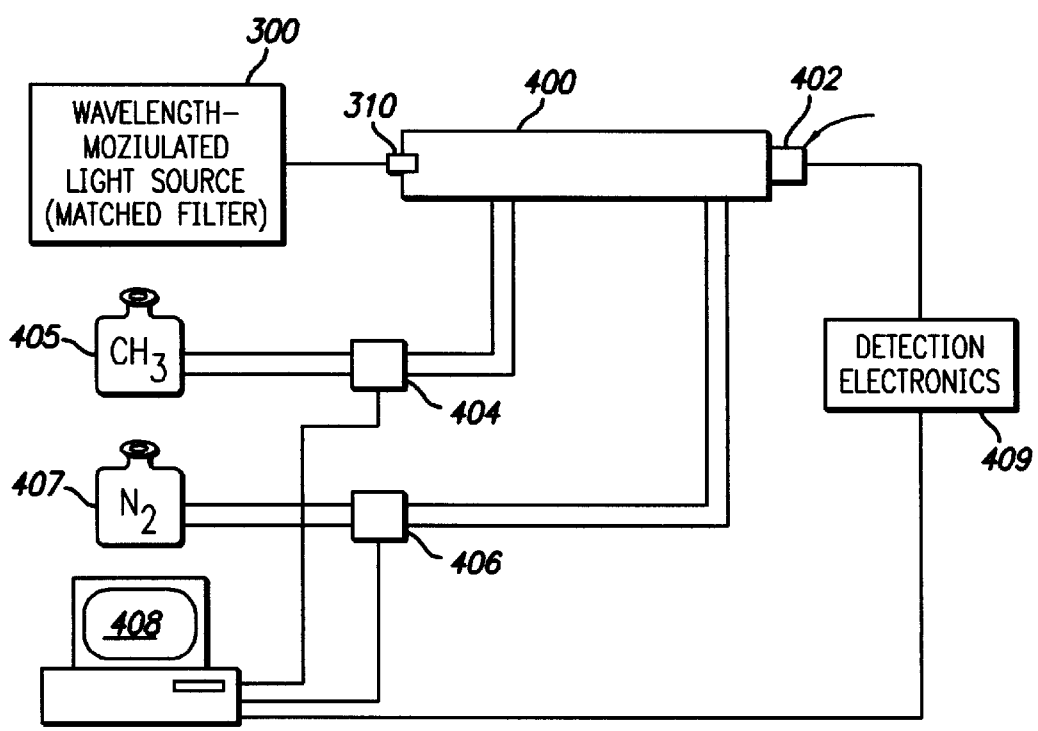
FIG. 24 illustrates a block diagram schematic representation of the correlation spectroscopy demonstration of FIG. 23.

FIGS. 23 and 24 illustrate an experimental set-up utilized to demonstrate the effectiveness of the invention for correlation spectroscopy. As shown in FIG. 24 in order to perform the demonstration, a gas cell 400 with a path length of 1 meter was built for testing the matched filter assembly 300 of the invention. The cell 400 included the fiber optic collimator 310 (without the detector 314) of the assembly 300 shown in FIG. 19 at the input end of the cell, and a photo detector 402 at the opposite end of the cell. The photo detector 402 for the experiment was an InGaAs pin photo diode from "Fermionics Opto-Technology" having an active area of 3 square millimeters, a shunt resistance of 10 OHMS, 729 pF, and a responsivity at 1300 NMS of 0.99 A/W. The gas cell 400 was a thin glass tube with a length of about 1 meter. The gas cell was also connected to two mass flow controllers 404 and 406. Controller 404 was connected to a reservoir 405 containing 100% methane and controller 406 was connected to a reservoir 407 containing 100% nitrogen. Each of the mass flow controllers 404 and 406 was electronically programmable in 1% increments via a computer 408 so that the concentration of gases within the cell could be varied from between all nitrogen and all methane by 1% increments for the two substances. Detection electronics 409 were coupled to the computer, the photo-detector 402, and the flow controllers 404 and 406 for detecting the appropriate output signals.

To conduct the test, light energy from a wavelength modulated light source 410 shown in FIG. 23 (in place of the light source 302 of the assembly 300) was directed into the optical fiber tunable filter 58 of the assembly 300. Light energy reflected by the tunable filter 58 back into the fiber optic collimator 310 of the assembly 300 was optically coupled into the gas cell 400. The optical signal was passed through the cell and detected by a photo-detector 402 at the other end. The photo-detector delivered an optical signal to detection electronics 409 that interpreted and converted the signal to useful data as necessary prior to sending the data to the computer 408.

The electronics of the wavelength modulated light source 410 consisted of a transimpedence amplifier 412, a lock-in amplifier 414, and a 12-bit data acquisition system (not shown). A common function generator 416 supplied a signal to the power amplifier 412 for driving the matched filter modulator 309, and supplied a reference signal for a phase-sensitive detector 420. A photodiode 418 was connected to the amplifier 414 which was connected to the detector 420. FIG. 23 illustrates a block diagram of the electronics of the light source signal 410 and FIG. 24 illustrates a block diagram of the experimental correlation spectroscopy set-up.

During the experiments, methane detection was first performed at 100 Hz pressure modulation in the cell 400 without using the tunable filter assembly 300 of the invention. Instead, the first trial was conducted by attaching a detector directly to the cell and taking measured readings. The extinction coefficient at 1331 nm for methane is about $2.0 \times 10^{-4}$ $Torr^{-1}m^{-1}$. The attenuation at 1331 nm for 760 Torr through the 1 m path length of the gas cell was about 0.66 dB. The reported absorption at the wavelengths selected for the matched filter were approximately one half that of 1331 nm, producing a 0.3 dB signal for a 100% $CH_4$ or methane environment. The measured attenuation utilizing no tunable filter for the multiple-line or wavelength light source in 100% methane was about 0.2 dB. The observed attenuation was within the acceptable experimental error and agrees with estimates made in calculations.

The experiment was conducted measuring at only between 5% and 7% attenuation of the signal at 100% $Ch_4$. The noise level for the first measurement carried out without the matched filter assembly 300 was 10 mv with a signal level at 130 mv producing a signal to noise ratio of 13. Assuming a linear system, the no-filter measurements in the system are capable of a minimum detection level of 8% methane. This experiment was performed to evaluate the existing correlation spectroscopy techniques.

Figure 25:
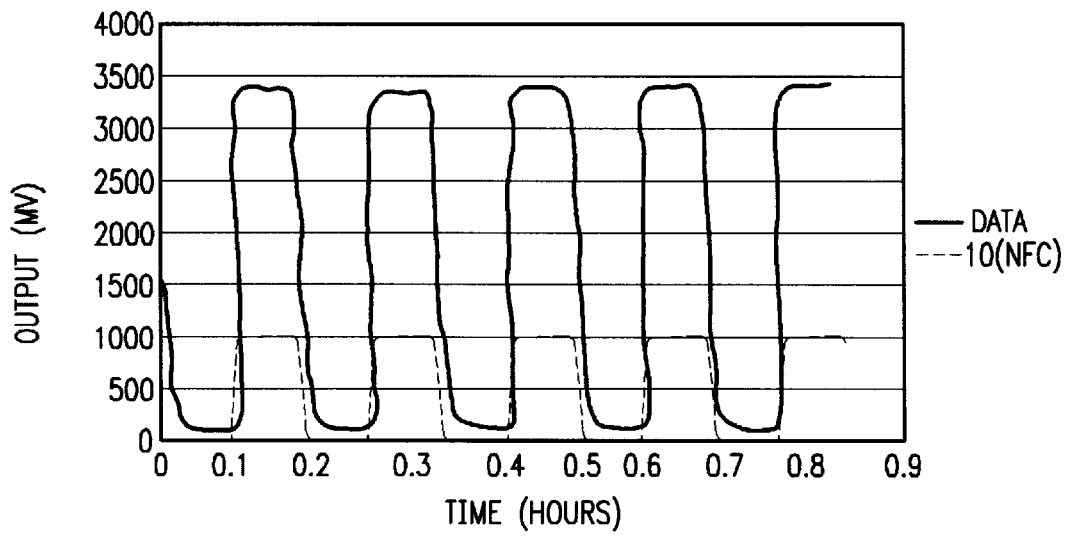
FIG. 25 illustrates a chart representing a response to methane concentration cycling from 0 to 100 percent within the gas cell of the demonstration shown in FIG. 24.

Significant improvements in the system's sensitivity occur when using the novel tunable methane-matched fiber optic filter assembly 300 to perform correlation spectroscopy. Several measurements during the experiment were conducted by modulating the methane-matched tunable filter system constructed in accordance with the present invention. For each measurement, the concentration of methane in the gas cell was changed. The modulation frequency of the optical signal was conducted at 100 Hz using the modulated fiber optic filter assembly 300. FIG. 25 illustrates a response curve of the system upon cycling the methane gas concentration in the cell 400 from 0 to 100% over a period of time. The solid line upper curve is the measured data and the dashed line lower curve is the mass flow controller signal. The results illustrated in FIG. 25 suggest that the inventive technique and device 300 produce good stability and sensitivity to methane even though the measurements were at 5% to 7% attenuation of the signals.

Figure 26:
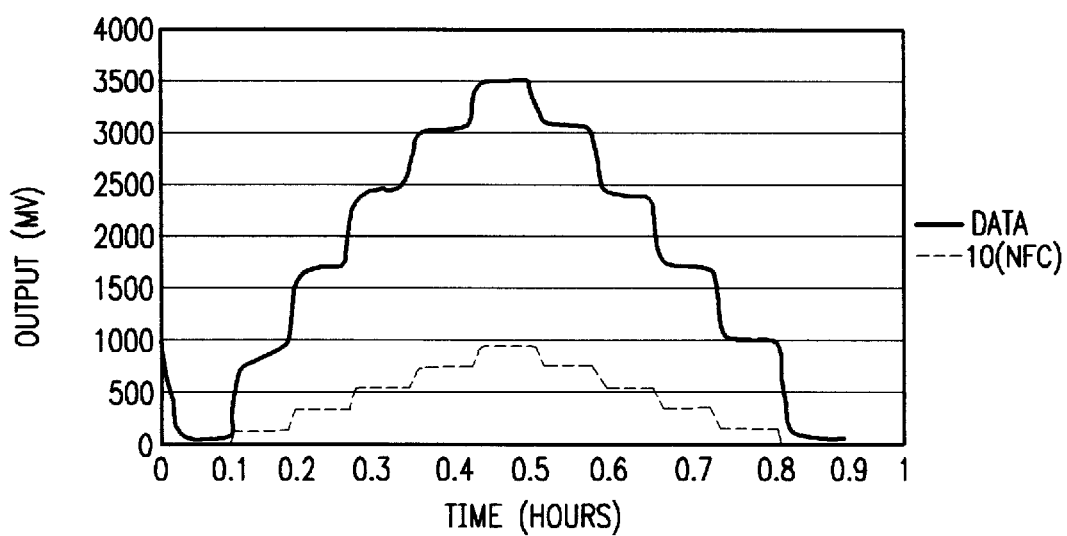
FIG. 26 illustrates a chart representing the response to methane concentration cycling from 0 to 100 percent within the gas cell at 20 percent step intervals.
Figure 27:
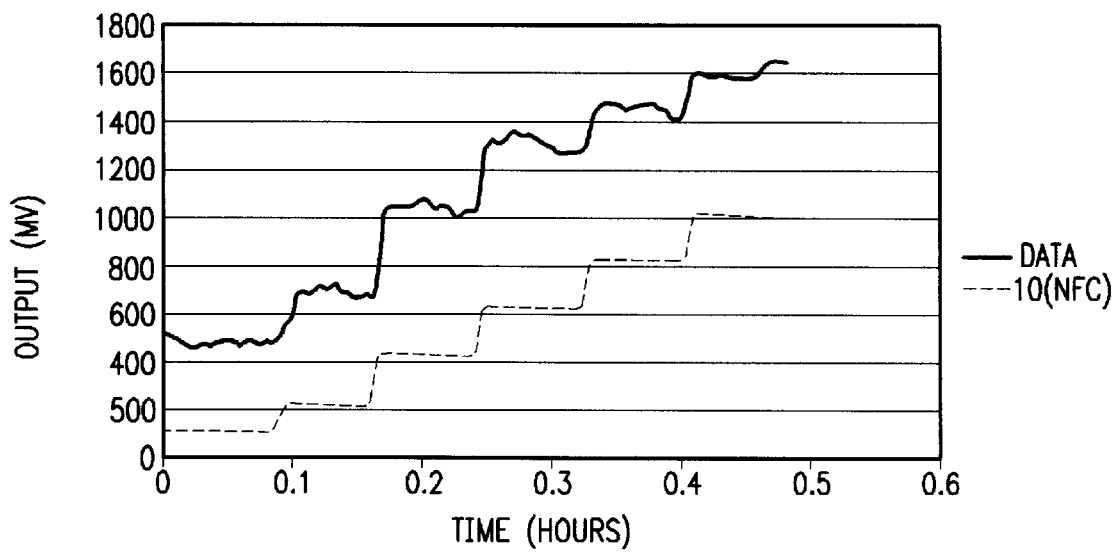
FIG. 27 illustrates a chart representing the response to methane concentration cycling from 0 to 10 percent within the gas cell in 2 percent step intervals.
Figure 28:
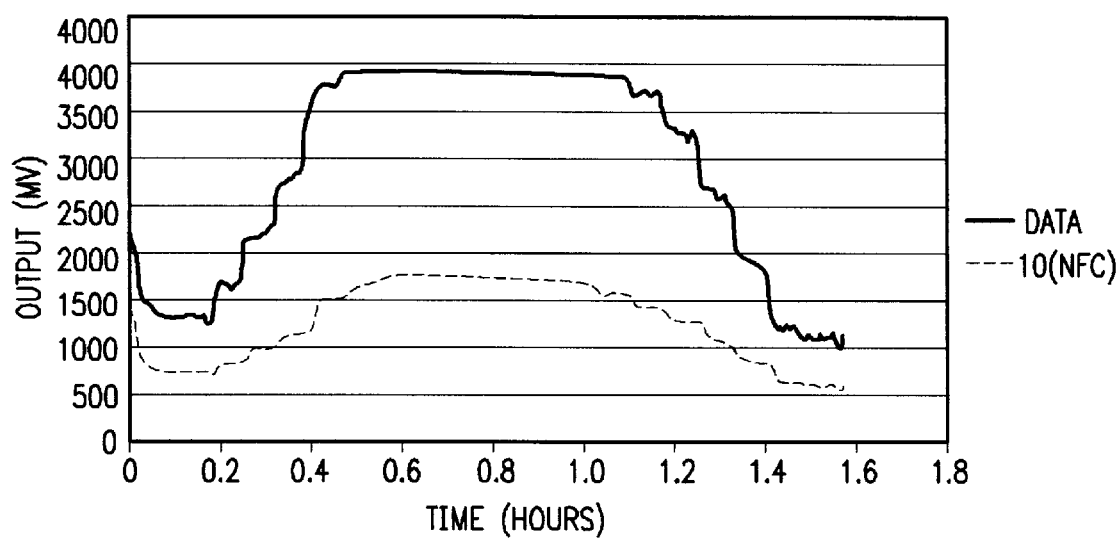
FIG. 28 illustrates a chart representing the response to methane concentration cycling from 0 to 10 percent within the gas cell in 1 percent step intervals.

FIG. 26 shows the measured response of a system at 20% steps in methane concentration within the gas cell 400. In order to obtain a system sensitivity limit, the measured response was also conducted at 2% steps and 1% steps for concentrations in the range of 0% to 10% methane. FIG. 27 illustrates the system response for 2% interval steps and FIG. 28 illustrates the system response at 1% interval steps. The results shown in FIG. 28 suggest that it is possible utilizing the experimental device to measure methane concentrations in an environment on the order of a few parts per 1000.

Therefore, using the same light source, detector, sample gas cell, and amplifier, the device constructed in accordance with the invention improves methane sensitivity by more than two orders of magnitude over a conventional system and method. A more sensitive mass flow control system may be substituted for the one described above so that a system can provide more reliable readings at higher sensitivity limits.

By using the light energy from the tunable filter in the reflected mode, i.e., the light energy reflected back to the input end, more accurate and higher sensitivity results can be obtained. This is because most of the light energy is transmitted through the filter to the output end. Only small amounts of light are reflected back by the periodic variations in the waveguide. By using the reflected signal, less light hits the detector and hence less signal noise is generated. Less signal noise results in much higher signal to noise ratios and thus better test results.

By conducting tests and measurements utilizing only the reflected light from the filter, only the reflected light representing the fingerprint of a selected substance is directed into the test area or environment. If the selected substance is present in the test environment, the light from the filter is absorbed in the environment. This is noted in the detected signal upon passing the light through the environment.

The invention is also useful for testing and detection of certain gases that are best suited for heterodyne detection techniques. In heterodyne detection, both the tunable filter reference spectrum representing a selected substance and the sample environment test spectrum are simultaneously modulated. The modulated signals are compared to obtain a beat frequency or sum difference between the two signals. The resulting differential signal is analyzed to determine the existence or absence of the selected substance in the environment.

G. Possible Alternative Uses for Inventive Technology

The invention is useful for purposes other than correlation spectroscopy. For example, the inventive tunable matched filter may be utilized to calibrate test equipment because the filters constructed according to the invention produce a known, highly accurate and sensitive characteristic wavelength spectrum. The test equipment to be calibrated can be set or adjusted according to the signal generated by the tunable filter assembly of the invention.

The matched filters of the invention can also be used for DIAL/LIDAR applications, to replace the gas reference cells currently in use. LIDAR or light detection and ranging involves emitting a laser pulse into an environment, typically the atmosphere, where the pulse has a wavelength of a strong absorption structure of a substance to be detected. Backscattered light is measured time resolved to detect the substance. DIAL or differential absorption LIDAR involves emitting a second laser pulse with less absorption than the first wavelength and measuring the backscattered light also time resolved. In DIAL/LIDAR, the two signals are compared to calculate the spatially resolved concentration of the substance. The limitation of such techniques are that only one wavelength can be emitted at a time using a laser. Alternatively, a gas cell containing a sample of the selected substance can be used to emit a wavelength spectrum signal representing the selected substance. This is similar to the currently used correlation spectroscopy technique described above. The tunable filter of the invention can replace the gas cell for LIDAR and DIAL applications. The tunable filter produces greater accuracy in test results and permits detection of broader ranges of selected substances.

Though the invention is described herein using specific embodiments and examples, other changes and modifications can be made without departing from the spirit and scope of the invention. The invention is therefore limited only by the scope of the following appended claims.

We claim:

1. An apparatus for matching a known waveband spectrum of a selected substance, the apparatus comprising:
    an optical waveguide having a core material, a nominal core refractive index, an input end and an output end wherein the optical waveguide transmits light energy from the input to the output end through the core material;
    a plurality of periodic variations in the refractive index carried in the optical waveguide core between the input and the output ends, said periodic variations being chosen to change the nominal core refractive index to reflect selected wavelengths of light back toward the input end to produce a reference spectrum having characteristic wavelengths matching the known spectrum of the selected substance; and
    a modulator coupled to the optical waveguide to modulate the periodic variations in the core refractive index to selectively and intermittently shift the reflected wavelengths of the optical waveguide.

2. The apparatus according to claim 1, further comprising:
    a light source coupled to the input end of the optical waveguide, the light source selected from at least one of a standard incandescent bulb, a light emitting diode, a laser diode, and a laser optical fiber.

3. The apparatus according to claim 1, wherein the modulator further comprises:
    an energy source operably coupled to the optical waveguide to selectively and intermittently alter a physical characteristic of the optical waveguide to cause modulation of the periodic variations.

4. The apparatus according to claim 1, wherein the optical waveguide is an optical fiber having a fiber core as the core material and a cladding surrounding the fiber core.

5. The apparatus according to claim 4, wherein the periodic variations in the core refractive index are at least one Bragg grating formed in the fiber core wherein the at least one Bragg grating has a plurality of discrete altered refractive index regions disposed adjacent one another along the fiber core.

6. The apparatus according to claim 5, wherein the modulator further comprises:
    an energy source coupled to the optical fiber to selectively and intermittently stretch the optical fiber to alter a spacing between the altered refractive index regions of the at least one Bragg grating.

7. The apparatus according to claim 6, wherein the modulator further comprises:
    a glass capillary tube having a longitudinal opening wherein the optical fiber extends through the opening and is adhered to the capillary tube in the opening with the at least one Bragg grating disposed under the capillary tube; and
    a piezoelectric cylinder encapsulating and adhered to the capillary tube and coupled to the energy source.

8. The apparatus according to claim 6, wherein the modulator further comprises:
    a radial poled jacket having a length and being wrapped around a portion of the optical fiber with the at least one Bragg grating under the jacket; and
    a piezoelectric outer material layer having a length and encapsulating the jacket and coupled to the energy source.

9. The apparatus according to claim 5, wherein the at least one Bragg grating is formed in the fiber core by stripping away portions of the cladding and directing high intensity, ultraviolet light energy onto the exposed portions of the fiber core.

10. The apparatus according to claim 9, wherein the high intensity, ultraviolet light energy is generated by a high frequency doubled noble gas pumped halide dye laser.

11. The apparatus according to claim 5, wherein the at least one Bragg grating is formed in the fiber core by stripping away a portion of the cladding and directing high intensity ultraviolet light through at least one high resolution optical mask onto the exposed portions of the fiber core.

12. The apparatus according to claim 4, wherein the optical mask is a photolithographic mask.

13. The apparatus according to claim 1, further comprising:
- a carrier substrate on which the optical waveguide is carried, and wherein the modulator is adapted to selectively and intermittently alter a physical characteristic of the carrier substrate to apply a stress to the optical waveguide to modulate the periodic variations in the core refractive index.

14. The apparatus according to claim 1, wherein the modulator further comprises:
- a carrier substrate on which the optical waveguide is carried, the substrate having an alterable physical characteristic; and
- an energy source coupled to the carrier substrate for applying energy to the substrate to intermittently and selectively change the alterable physical characteristic to apply stress to the optical waveguide.

15. The apparatus according to claim 14, wherein the carrier substrate is at least in part made of a piezoelectric material having the alterable physical characteristic, and wherein the energy source is an electric power source coupled to the piezoelectric material.

16. The apparatus according to claim 14, wherein the carrier substrate is a piezoelectric cylinder having a circumference around which the optical waveguide is wrapped and wherein the alterable physical characteristic is the circumference of the cylinder.

17. The apparatus according to claim 1, wherein the modulator further comprises:
- an elongate cantilevered beam having a rigidly supported end, an opposite free end, and a carrier surface extending between the supported and free ends and on which the optical waveguide is carried;
- an electromagnetic actuator having a movable portion connected to the free end; and
- an electronic driver connected to the electromagnetic actuator for driving the movable portion of the actuator to selectively and intermittently move the free end of the beam to apply stress to the optical waveguide.

18. The apparatus according to claim 1, wherein the modulator further comprises:
- a bimorph substrate having a surface on which the optical waveguide is carried, the surface having an alterable physical characteristic; and
- an energy source coupled to the bimorph substrate to apply energy to the bimorph substrate for altering the physical characteristic of the surface to apply stress to the optical waveguide.

19. The apparatus according to claim 1, wherein the optical waveguide is an integrated optic planar waveguide.

20. The apparatus according to claim 1, adapted for use as an artificial reference cell for correlation spectroscopy by comparing a sample spectrum of a test environment to the reference spectrum of the apparatus simulating the known spectrum of the selected substance.

21. The apparatus according to claim 1, adapted for use as an artificial reference cell to calibrate a measuring device that measures a waveband spectrum output by setting the measuring device according to the reference waveband spectrum output of the apparatus.

22. The apparatus according to claim 1, adapted for use as an artificial reference cell for one application selected from at least DIAL and LIDAR applications.

23. The apparatus according to claim 1, wherein the reference spectrum is comprised of light energy exiting the input end of the waveguide and produced only by the wavelengths reflected back to the input end by the periodic variations.

24. The apparatus according to claim 1, wherein the reference spectrum is comprised of light energy exiting the output end of the waveguide and produced only by a plurality of wavelengths transmitted to the output end.

25. A method of matching a known waveband spectrum of a selected substance, the method comprising the steps of:
- providing an optical waveguide having a core material, a nominal core refractive index, an input end and an output end;
- forming periodic variations in the core material to change the nominal core refractive index of the optical waveguide at the periodic variations between the input and the output ends so that the periodic variations reflect selected wavelengths of light back toward the input end to produce a reference spectrum that matches the known spectrum of the selected substance;
- coupling a light source to the input end of the optical waveguide;
- transmitting light energy from the light source into the input end and through the core material of the optical waveguide to the output end; and
- modulating the periodic variations in the core material to selectively and intermittently shift the reflected wavelengths of the optical waveguide.

26. The method according to claim 25, further comprising the step of:
- comparing the reference spectrum of the optical waveguide to a sample spectrum measured from a test environment to determine if the selected substance is present in the test environment.

27. The method according to claim 25, further comprising the step of:
- utilizing the reference spectrum of the waveguide to calibrate a spectroscope.

28. The method according to claim 25, further comprising the step of:
- utilizing light energy exiting the input end of the waveguide produced only by the wavelengths reflected by the periodic variations as the reference spectrum.

29. The method according to claim 25, further comprising the step of:
- utilizing light energy exiting the output end of the waveguide produced only by a plurality of wavelengths passing through the waveguide to determine if the selected substance is present.

30. The method according to claim 25, wherein the step of providing an optical waveguide further comprises:
- providing an optical fiber as the optical waveguide wherein the optical fiber further includes a fiber core as the core material and a cladding surrounding the fiber core.

31. The method according to claim 30, wherein the step of forming periodic variations further comprises:

forming at least one Bragg grating having a plurality of periodic altered refractive index regions adjacent one another along the fiber core as the periodic variations.

32. The method according to claim 31, wherein the step of forming periodic variations further comprises:

stripping away at least one portion of the cladding to expose at least one fiber core section; and directing high intensity ultraviolet light energy onto the exposed at least one fiber core section of the fiber core to form the at least one Bragg grating.

33. The method according to claim 32, wherein the step of directing high intensity ultraviolet light energy further comprises:

directing the high intensity ultraviolet light energy onto the exposed at least one fiber core section through a high resolution photolithographic mask.

34. The method according to claim 25, wherein the step of providing an optical waveguide further comprises:

providing a planar layered substrate as the optical waveguide wherein the substrate has a core layer as the core material and wherein the periodic variations are formed in the core material layer.

35. The method according to claim 25, wherein the step of providing an optical waveguide further comprises:

providing an integrated optics planar waveguide as the optical waveguide.

36. The method according to claim 25, wherein the step of coupling a light source further comprises:

selecting the light source from one of at least a standard incandescent bulb, a light emitting diode, a laser diode, and a laser fiber.

37. The method according to claim 25, wherein the step of modulating the periodic variations further comprises:

mounting the optical waveguide on a carrier substrate, the carrier substrate having an alterable physical characteristic;

connecting an energy source to the carrier substrate; and selectively applying energy from the energy source to the carrier substrate to intermittently alter the physical characteristic and thereby apply stress to the optical waveguide at the periodic variations.

38. The method according to claim 25, wherein the step of modulating the periodic variations further comprises:

mounting the optical waveguide to a piezoelectric element, the piezoelectric element having an alterable physical characteristic;

connecting an electric power source to the piezoelectric element; and selectively applying an electric power from the electric power source to the piezoelectric element to intermittently alter the physical characteristic thereby applying stress to the optical waveguide at the periodic variations.

39. The method according to claim 38, wherein the step of mounting the optical waveguide further comprises:

providing a piezoelectric cylinder as the element wherein the cylinder has a circumference and the alterable physical characteristic is the circumference;

wrapping the optical waveguide around the circumference of the piezoelectric cylinder; and intermittently altering the circumference of the cylinder to apply stress to the optical waveguide.

40. The method according to claim 25, further comprising the steps of:

providing an optical fiber as the optical waveguide, the optical fiber having a cladding and a fiber core as the core material;

passing the optical fiber axially through a glass capillary tube having a length;

adhering the capillary tube to the optical fiber over the periodic variations in the fiber core;

inserting the capillary tube axially through an elongate piezoelectric cylinder having a length;

adhering the piezoelectric cylinder to the glass capillary tube; and selectively altering the length of the capillary tube and the piezoelectric cylinder to intermittently stretch the optical fiber at the periodic variations to modulate the periodic variations.

41. The method according to claim 25, further comprising the steps of:

providing an optical fiber as the optical waveguide, the optical fiber having a cladding and a fiber core as the core material;

wrapping a radial poled elongate jacket having a length around the optical fiber;

adhering the jacket to the optical fiber over the periodic variations in the fiber core;

adhering a piezoelectric layer of material over the jacket; and selectively altering the length of the piezoelectric layer and the jacket to intermittently stretch the optical fiber at the periodic variations.

42. The method according to claim 25, further comprising the steps of:

providing an elongate beam having a first end and a second end and a carrier surface;

affixing the first end of the elongate beam to a support;

adhering the optical waveguide to the carrier surface of the beam between the first and second ends;

connecting a movable portion of an electromagnetic actuator to the second end;

coupling an electronic driver to the electromagnetic actuator; and selectively driving the movable portion of the electromagnetic actuator to move the free end of the beam and thereby apply stress to the optical waveguide at the periodic variations.

43. The method according to claim 25, further comprising the steps of:

providing a bimorph substrate having a surface with an alterable physical characteristic;

adhering the optical waveguide to the surface of the bimorph substrate;

connecting an electric power source to the bimorph substrate; and selectively applying electric power from the power source to the bimorph substrate to intermittently alter the physical characteristic of the surface to thereby apply stress to the optical waveguide at the periodic variations.

44. A method of detecting the presence of a selected substance in a test environment where the selected substance has a known waveband spectrum, the method comprising the steps of:

passing light energy into the test environment;

detecting the light energy after passing through the test environment representing a sample spectrum of the environment;

providing an optical waveguide having a core material with a nominal core refractive index and an input end and an output end;

forming periodic variations in the core material to alter the core refractive index of the optical waveguide at the periodic variations between the input and the output ends so that the optical waveguide produces a reference spectrum that matches the known spectrum of the selected substance;

passing light energy into the input end of the optical waveguide;

detecting the light energy emitted by the optical waveguide representing the reference spectrum; and comparing the reference spectrum to the sample spectrum.

45. The method according to claim 44, wherein the step of detecting the light energy emitted by the optical waveguide further comprises:

detecting the light energy exiting the output end of the optical waveguide and produced only by a plurality of wavelengths passing through the optical waveguide to the output end.

46. The method according to claim 44, wherein the step of detecting the light energy emitted by the optical waveguide further comprises:

detecting the light energy exiting the input end of the optical waveguide and produced only by the wavelengths reflected back to the input end by the periodic variations.

47. The method according to claim 44, wherein the steps of passing further comprise:

passing the light energy first into the optical waveguide and then detecting the light energy exiting the input end of the optical waveguide representing the reference spectrum; and passing the detected light energy from the optical waveguide into the test environment.

48. The method according to claim 44, wherein the steps of passing further comprise:

providing a light source;

passing light energy emitted by the light source into the optical waveguide; and simultaneously passing light energy emitted by the light source into the test environment.

49. An apparatus for matching a known spectrum of a selected substance, the apparatus comprising:

an optical waveguide having a core material, a nominal core refractive index, an input end and an output end wherein the optical waveguide transmits light energy from the input to the output end through the core material;

a plurality of periodic variations in the refractive index carried in the optical waveguide core between the input and the output ends changing the nominal core refractive index to reflect selected wavelengths of light back toward the input end to produce a reference spectrum at the output end of the waveguide having characteristic wavelengths matching the known spectrum of the selected substance; and a modulator coupled to the optical waveguide to modulate the periodic variations in the core refractive index to selectively and intermittently shift the reflected wavelengths in the reference spectrum of the optical waveguide.

50. An apparatus for matching a known spectrum of a selected substance, the apparatus comprising:

an optical waveguide having a core material, a nominal core refractive index, an input end and an output end wherein the optical waveguide transmits light energy from the input to the output end through the core material;

a plurality of periodic variations in the refractive index carried in the optical waveguide core between the input and the output ends changing the nominal core refractive index to reflect selected wavelengths of light back toward the input end to produce a reference spectrum at the input end of the waveguide having characteristic wavelengths matching the known spectrum of the selected substance; and a modulator coupled to the optical waveguide to modulate the periodic variations in the core refractive index to selectively and intermittently shift the reflected wavelengths in the reference spectrum of the optical waveguide.

\* \* \* \* \*